United States Patent
Taniguchi et al.

(10) Patent No.: US 8,951,447 B2
(45) Date of Patent: *Feb. 10, 2015

(54) OPTICALLY PUMPED SEMICONDUCTOR AND DEVICE USING THE SAME

(75) Inventors: Noboru Taniguchi, Osaka (JP); Kenichi Tokuhiro, Osaka (JP); Takahiro Suzuki, Osaka (JP); Tomohiro Kuroha, Aichi (JP); Takaiki Nomura, Osaka (JP); Kazuhito Hatoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 13/119,117

(22) PCT Filed: Apr. 26, 2010

(86) PCT No.: PCT/JP2010/002971

§ 371 (c)(1),
(2), (4) Date: Mar. 15, 2011

(87) PCT Pub. No.: WO2010/125787

PCT Pub. Date: Nov. 4, 2010

(65) Prior Publication Data

US 2011/0203661 A1    Aug. 25, 2011

(30) Foreign Application Priority Data

Apr. 28, 2009 (JP) ................. 2009-110097

(51) Int. Cl.
*H01B 1/02* (2006.01)
*B01J 35/00* (2006.01)
(Continued)

(52) U.S. Cl.
CPC .............. *B01J 35/004* (2013.01); *B01J 23/002* (2013.01); *B01J 23/08* (2013.01); *B01J 23/10* (2013.01);
(Continued)

(58) Field of Classification Search
USPC .......... 252/500, 519.5; 136/258, 256; 429/33, 429/411
See application file for complete search history.

(56) References Cited

U.S. PATENT DOCUMENTS 6,235,417 B1 * 5/2001 Wachsman et al. .......... 429/411
6,517,693 B2   2/2003 Taniguchi
(Continued)

FOREIGN PATENT DOCUMENTS

CN   1461238   12/2003
EP   1 362 831 11/2003
(Continued)

OTHER PUBLICATIONS

Kudo, "Development of Visible-light-driven oxide and sulfide photocatalysts for $H_2$ production from aqueous solutions", Report Photocatalysis, vol. 15, The 11th symposium—Latest findings of photocatalytic reaction, Dec. 14, 2004, pp. 26-29—with a partial translation.

(Continued)

*Primary Examiner* — Khanh Tuan Nguyen
(74) *Attorney, Agent, or Firm* — Hamre, Schumann, Mueller & Larson, P.C.

(57) ABSTRACT

The optically pumped semiconductor according to the present invention is an optically pumped semiconductor that is a semiconductor of a perovskite oxide. The optically pumped semiconductor has a composition represented by a general formula: $BaZr_{1-x}M_xO_{3-\alpha}$, where M denotes at least one element selected from trivalent elements, x denotes a numerical value more than 0 but less than 0.8, and α denotes an amount of oxygen deficiency that is a numerical value more than 0 but less than 1.5. The optically pumped semiconductor has a crystal system of a cubic, tetragonal, or orthorhombic crystal. When lattice constants of the crystal system are referred to as a, b, and c, provided that a≤b≤c, conditions that 0.41727 nm≤a, b, c≤0.42716 nm and a/c≥0.98 are satisfied.

25 Claims, 11 Drawing Sheets

(51) Int. Cl.
  *B01J 23/00* (2006.01)
  *B01J 23/08* (2006.01)
  *B01J 23/10* (2006.01)
  *B01J 23/62* (2006.01)
  *C01B 3/04* (2006.01)
  *C01B 13/02* (2006.01)
  *C01G 25/00* (2006.01)
  *C25B 1/00* (2006.01)

(52) U.S. Cl.
  CPC ............... *B01J 23/62* (2013.01); *C01B 3/042* (2013.01); *C01B 13/0207* (2013.01); *C01G 25/006* (2013.01); *C25B 1/003* (2013.01); *B01J 2523/00* (2013.01); *C01P 2002/52* (2013.01); *C01P 2002/54* (2013.01); *C01P 2002/72* (2013.01); *C01P 2002/77* (2013.01); *C01P 2002/84* (2013.01); *C01P 2004/34* (2013.01); *C01P 2006/40* (2013.01); *Y02E 60/364* (2013.01)
  USPC ........ 252/519.5; 252/500; 136/256; 136/258; 429/411

(56) References Cited

U.S. PATENT DOCUMENTS

| | | |
|---|---|---|
| 2003/0148881 A1 | 8/2003 | Matsuo et al. |
| 2005/0260477 A1* | 11/2005 | Taniguchi .................. 429/33 |
| 2010/0101643 A1* | 4/2010 | Takahashi et al. ........... 136/256 |

FOREIGN PATENT DOCUMENTS

| | | | |
|---|---|---|---|
| EP | WO 2008-120810 | * 10/2008 | ........... C07D 213/22 |
| JP | 7-024329 | 1/1995 | |
| JP | 8-196912 | 8/1996 | |
| JP | 10-244164 | 9/1998 | |
| JP | 2003-033662 | 2/2003 | |
| JP | 2003-155440 | 5/2003 | |
| JP | 2005-103496 | 4/2005 | |
| JP | 3733030 | 10/2005 | |
| JP | 4243690 | 3/2009 | |
| JP | 2001-307546 | 11/2011 | |

OTHER PUBLICATIONS

Yuan, et al., "Synthesis and photocatalytic characterization of a new photocatalyst $BaZrO_3$" International Journal of Hydrogen Energy, vol. 33, 2008, pp. 5941-5946.

Kreuer, "Proton Conducting Oxides", Annu. Rev. Mater. Res., vol. 33, pp. 333-359, Apr. 2003.

Babilo, et al., "Processing of Yttrium Doped Barium Zirconate for High Proton Conductivity", J. Mater. Res., vol. 22, No. 5, pp. 1322-1330, May 2007.

Manthiram, et al., "Characterization of Oxygen Deficient Perovskites as Oxide Ion Electrolytes", Solid State Ionics, vol. 62, pp. 225-234, Mar. 1993.

* cited by examiner

US 8,951,447 B2

OPTICALLY PUMPED SEMICONDUCTOR AND DEVICE USING THE SAME

TECHNICAL FIELD

The present invention relates to an optically pumped semiconductor and a device using the optically pumped semiconductor.

BACKGROUND ART

From the viewpoint of reducing carbon dioxide gas emission and cleaning energy, hydrogen energy systems have been attracting attention. When used as energy medium, hydrogen can generate electricity and heat using fuel cells, and hydrogen can generate heat and power by being combusted directly. In these cases, the final product is safe and innoxious water, creating a clean energy circulation cycle. Most of hydrogen as an energy medium is produced from petroleum or natural gas by cracking using a catalyst, although hydrogen as an energy medium exists naturally as well. It also is possible to produce hydrogen and oxygen by electrolyzing water, but this cannot be a fundamental solution because the electrolysis needs electric energy. It also is possible to use a system in which a solar cell converts light energy into electricity so as to perform electrolysis with this electric power. However, taking into consideration the manufacturing cost of the solar cell, energy consumption, and electricity storing technique, the hydrogen production method using such a system is not necessarily an effective method.

In contrast, hydrogen production using a photocatalyst is a system for producing hydrogen directly from water and sunlight, and can convert the sunlight energy effectively into hydrogen energy (see Patent Literatures 1, 2, and 3). However, even when an anatase titanium oxide, a typical photocatalyst, is used, the solar-to-hydrogen conversion efficiency is about 0.5%, which needs to be enhanced much further. A problem here is that the titanium oxide photocatalyst itself absorbs only ultraviolet rays with a wavelength of 400 nm or less in sunlight so as to be pumped. Therefore, a material that can be pumped by visible light is expected, that is, development of a visible-light-responsive photocatalytic material is expected. Meanwhile, cells, devices, and apparatuses for producing hydrogen efficiently also are being studied. They roughly can be categorized into powder type and electrode type.

The powder type is a system in which a powdered photocatalytic material is dispersed directly in an aqueous solution and particles of the photocatalytic material are irradiated with light so as to produce hydrogen and oxygen, and when certain amounts of the gases are produced, the oxygen and hydrogen are separated from each other. In contrast, the electrode type is a system in which an electrode obtained by applying a photocatalytic material to an ITO (Indium Tin Oxide) film or a conductive substrate to form a film thereon is used. In the electrode type, the electrode on which the photocatalyst film has been formed is connected, with a conducting wire, to a conductor, such as a platinum plate, that functions as a counter electrode, the electrode on which the photocatalyst film has been formed is irradiated with light so as to produce oxygen at this electrode, and electrons pumped at the same time when the oxygen is produced are guided to the counter electrode so as to produce hydrogen at the counter electrode. The powder type is simple in structure and convenient to use, but it is difficult to separate hydrogen and oxygen from each other, thereby lowering the efficiency. In the electrode type, since hydrogen and oxygen are produced at different electrodes, it is easy to separate hydrogen and oxygen from each other, but there is a restriction that it is necessary to form a photocatalytic material into an electrode.

Similarly to the above-mentioned systems in which hydrogen is used as an energy medium, solar cells, each being a device for converting sunlight directly into electricity, also are attracting a lot of attention from the viewpoint of cleaning energy. Usually, the solar cells have a mechanism in which a p-type semiconductor and an n-type semiconductor are bonded to each other, and the photoelectromotive force generated between the p-type semiconductor and the n-type semiconductor is extracted as electricity. In the solar cells, an Si crystalline body or amorphous Si is used as a main semiconductor material, and this is doped with a dopant to form the n-type semiconductor and the p-type semiconductor.

Currently, compounds having a photocatalytic property that allows water to be decomposed so as to produce hydrogen and oxygen are rare and few. The visible-light-pumped photocatalysts capable of decomposing water that have been reported so far are few, only $Ta_3N_5$, $Ag_3VO_4$ and so on. Thus, it has been expected to develop a visible-light-pumped photocatalytic material capable of absorbing visible light so as to be pumped and decomposing water into hydrogen and oxygen. When referred to by the type of material structure, the photocatalytic property has been found in perovskite oxides such as $SrTiO_3$, $BaTiO_3$, $CaTiO_3$, and $BaZrO_3$, and simple oxides such as $WO_3$ (see Non-patent Literature 2, for example). However, there have been found very few oxides that are capable of decomposing water and can be used as a photocatalytic material that is pumped by visible light with a wavelength of 460 nm or more. Also, materials for which sunlight or a fluorescent lamp can be used, that is, visible-light-pumped materials, currently are very few among photocatalytic materials that decompose, or oxidize partially or reduce partially fats and oils and organic substances. As optically pumped semiconductors for solar cells, chalcogenides, such as CdS, CuInS, SiC, Te, Se, In, and Ga, have been used, but oxide semiconductors that are highly resistant to moisture and can absorb visible light so as to be pumped have not been found.

CITATION LIST

Patent Literature

PTL 1: JP 7(1995)-24329 A
PTL 2: JP 8(1996)-196912 A
PTL 3: JP 10(1998)-244164 A
PTL 4: JP 2005-103496 A
PTL 5: JP 2003-155440 A

Non-Patent Literature

NPL 1: Photo functionalized materials society, report Photocatalysis (the 11th symposium), Vol. 15, 26 to 29 (2004))
NPL 2: Yunpeng Yuan et al., International J. of Hydrogen Energy, 33, 5941 to 5946 (2008)

SUMMARY OF INVENTION

Technical Problem

For devices in which a photocatalyst is irradiated with light, such as sunlight, so as to produce hydrogen from water, there have been very few photocatalytic materials that are capable of decomposing water by oxidation and reduction and for which visible light can be used. Moreover, most of the photocatalytic materials capable of decomposing organic substances or capable of oxidizing partially or reducing partially organic substances are pumped by ultraviolet rays, and there have been almost no photocatalytic materials for which visible light, such as sunlight and fluorescent lamp light, can be used. Since $Ta_3N_5$ and $Ag_3VO_4$ reported as visible-light-responsive photocatalytic materials so far are materials containing a nitride or silver, the cost has been a problem. As a photocatalyst, a material that not only has high visible light absorbency but also takes the cost into consideration is needed.

In view of the conventional problems mentioned above, the present invention is intended to provide a visible-light-pumped material that can function as a photocatalyst.

Solution to Problem

The present invention provides an optically pumped semiconductor that is a semiconductor of a perovskite oxide. The optically pumped semiconductor has a composition represented by a general formula: $BaZr_{1-x}M_xO_{3-\alpha}$, where M denotes at least one element selected from trivalent elements, x denotes a numerical value more than 0 but less than 0.8, and $\alpha$ denotes an amount of oxygen deficiency that is a numerical value more than 0 but less than 1.5. The optically pumped semiconductor has a crystal system of a cubic, tetragonal, or orthorhombic crystal. When lattice constants of the crystal system are referred to as a, b, and c, provided that $a \leq b \leq c$, conditions that 0.41727 nm$\leq$a, b, c$\leq$0.42716 nm and a/c$\geq$0.98 are satisfied.

The present invention further provides a device including the optically pumped semiconductor according to the present invention.

Advantageous Effects of Invention

The optically pumped semiconductor according to the present invention is pumped by visible light with a wavelength of at least 460 nm or more and can function as a photocatalyst. Therefore, with the optically pumped semiconductor according to the present invention, it is possible to provide devices, such as highly efficient photocatalytic hydrogen producing devices, organic substance decomposing devices, and devices for oxidizing partially or reducing partially organic substances, that have not been provided conventionally.

DESCRIPTION OF EMBODIMENTS

Figure 1:
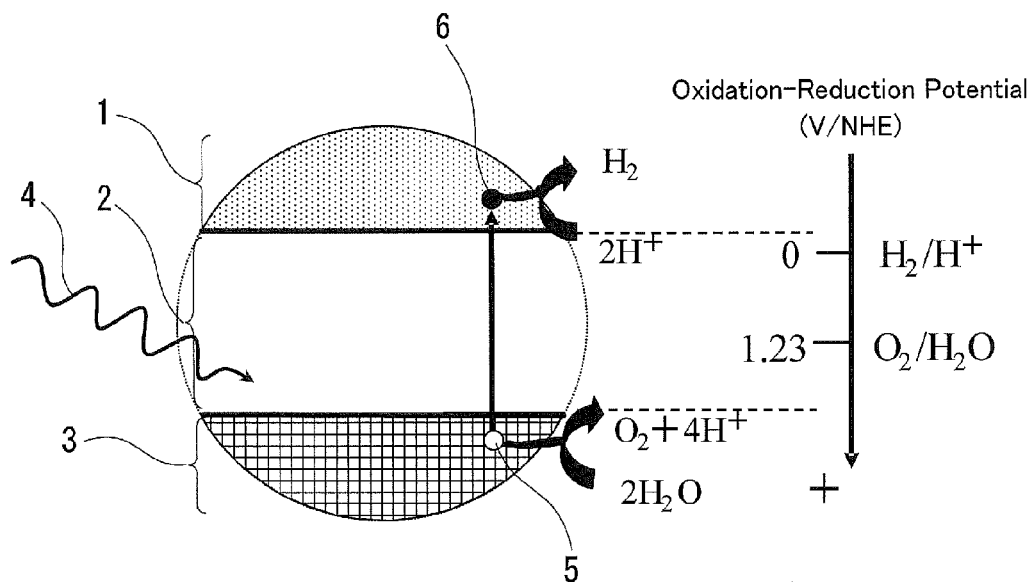
FIG. 1 is a schematic view illustrating a photocatalytic property in decomposing water by oxidation and reduction.

Hereinafter, embodiments according to the present invention will be described with reference to the drawings. The embodiments below are examples and the present invention is not limited to the following embodiments.

Embodiment 1

An embodiment of the optically pumped semiconductor according to the present invention will be described.

The optically pumped semiconductor of the present embodiment is a semiconductor of a perovskite oxide, and has a composition represented by a general formula: $BaZr_{1-x}M_xO_{3-\alpha}$, where M denotes at least one element selected from trivalent elements, x denotes a numerical value more than 0 but less than 0.8, and $\alpha$ denotes an amount of oxygen deficiency that is a numerical value more than 0 but less than 1.5. The optically pumped semiconductor has a crystal system of a cubic, tetragonal, or orthorhombic crystal. When lattice constants of the crystal system are referred to as a, b, and c, provided that $a \leq b \leq c$, conditions that 0.41727 nm$\leq$a, b, c$\leq$0.42716 nm and a/c$\geq$0.98 are satisfied.

The optically pumped semiconductor of the present embodiment is barium zirconate ($BaZrO_3$), which is a base material, with Zr therein having been partly substituted by a trivalent element such as In, Ga, and Gd. Basically, the optically pumped semiconductor of the present embodiment is a single phase polycrystalline body of a perovskite oxide. Preferably, the trivalent element (M in the general formula: $BaZr_{1-x}M_xO_{3-\alpha}$) that substitutes for Zr is at least one selected from the group consisting of In, Ga, and Gd.

Conventionally, $BaZrO_3$, which is a base material of the optically pumped semiconductor of the present embodiment, has been used, for example, as a main material of a ferroelectric material and a material for a crucible used for high temperature firing. $BaZrO_3$ is a perovskite oxide chemically and mechanically stable in the air and water. $BaZrO_3$ has a crystal system of almost cubic crystal, and has excellent three-dimensional isotropy and mechanical strength. In terms of optical property, $BaZrO_3$ has a whitish color and is tinged with a little yellowish green color when affected by ambient moisture. $BaZrO_3$ has an absorption edge wavelength around 420 nm according to an UV-Vis spectral analysis, and is a very common ceramic that is nearly an insulating material. The present inventors made a detailed study on the conductivity of this material, and have already reported that the material with Zr therein having been partly substituted by a trivalent element such as In, Gd, and Ga exhibits proton conductivity (JP 3733030 B, U.S. Pat. No. 6,517,693, and EP Patent 1362831). The present inventors have found that oxygen deficiency is caused in a bulk when tetravalent Zr is partly substituted by a trivalent element, and that oxygen deficiency is charge-compensated by holes and the holes are subject to an exchange reaction with external protons to exhibit proton conductivity. In addition, the present inventors have confirmed that these materials are stable under a constant temperature and humidity for 10000 hours or more as well as in boiling water for 100 hours or more.

An example of the method for manufacturing the optically pumped semiconductor according to the present invention will be described. The optically pumped semiconductor according to the present invention having a composition represented by the general formula: $BaZr_{1-x}M_xO_{3-\alpha}$ can be synthesized by a common high temperature solid phase reaction. When M is In, Ga, and/or Gd, a powder material of barium acetate, a powder material of zirconium hydroxide, and a powder material of indium oxide, a powder material of gallium oxide, and/or a powder material of gadolinium oxide are mixed together in specified amounts, respectively, and crushed and mixed using an ethanol solvent in an agate mortar, for example. After sufficient mixing, the solvent is removed from the mixture, and the resultant mixture is defatted with a burner and crushed and mixed again repeatedly in the agate mortar. Thereafter, the mixture is press-molded into a cylindrical shape and fired at 1200° C. to 1400° C. for 10 hours to 12 hours. The fired material is coarsely ground, and then is subject to planetary ball mill crushing in a benzene or cyclohexane solvent and granulated into 3 μm or less. The obtained powder is vacuum-dried at 150° C., and then uniaxially pressed and hydrostatically pressed at 2 ton/cm² to be formed into a cylindrical shape. Immediately thereafter, it is fired at 1500° C. to 1700° C. for 6 hours to 12 hours to be synthesized into a sintered body. The sintered body obtained by this method is a single-phase perovskite oxide. The sintered body sufficiently is dense and can have a density that is 96% or more of a theoretical density. When sintered body specimens with various compositions satisfying the general formula: $BaZr_{1-x}M_xO_{3-\alpha}$ are produced by the above-mentioned method and subject to cross-section observation with an SEM (scanning electron microscope), the grain diameters are 1 to 30 μm.

In the after-mentioned examples of the optically pumped semiconductor according to the present invention, in order to check various properties such as crystal structure, composition, ultraviolet-visible light absorption spectrophotometric property, and photocatalytic property, the sintered body specimens produced by the above-mentioned method were processed into a disc shape with a thickness of 0.4 to 0.6 mm and a diameter of 13 to 16 mm and each of them was analyzed. The method used for analyzing the properties will be described later.

Figure 2:
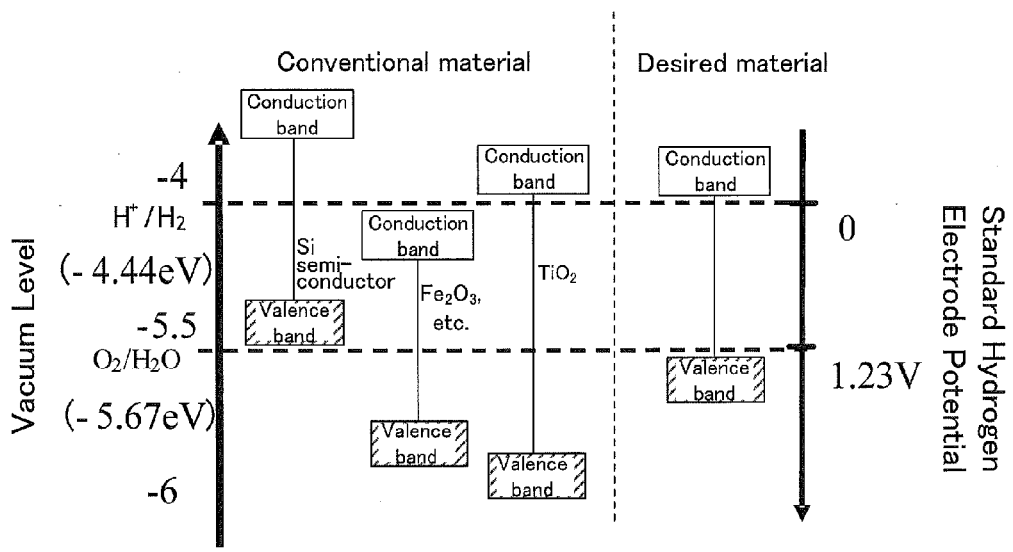
FIG. 2 is a diagram showing band gaps of conventional substances and an optically pumped semiconductor according to the present invention.

First, the photocatalytic property will be described. The photocatalytic property causes the following phenomenon. As shown in FIG. 1, a semiconductor that is nearly an insulating material is irradiated with light 4 from outside so as to absorb light corresponding to the width of a band gap 2 present between a conduction band 1 and a valence band 3 of the electronic structure, and electrons in the valence band 3 are pumped first. A pumped electron 6 is transferred to the conduction band 1. The electron 6 is transferred to a surface of a bulk of the semiconductor to make a reduction reaction. Conceivably, the reduction reaction reduces water, if present, to produce hydrogen, and reduces oxygen, if present, to produce a super oxide anion. Meanwhile, in the position in the valence band 3 from which the electron has come out, a hole 5 with a positive charge is formed. The hole 5 is transferred to the surface of the bulk of the semiconductor to make a strong oxidation reaction. The oxidation reaction generates an OH radical if water is present. If an organic substance is present nearby, the oxidation reaction oxidizes strongly the organic substance to decompose it into water and $CO_2$. Moreover, if water is present nearby, the oxidation reaction oxidizes the water to produce oxygen. Conventionally, it has been known that a titanium oxide, which is common as a photocatalyst, decomposes organic substances and produces hydrogen and oxygen from water, and thus the photocatalytic property of the titanium oxide can be confirmed by allowing the titanium oxide to decompose an organic substance or water. Generally, with regard to the photocatalytic property of decomposing an organic substance, the oxidizing power of the OH radical particularly is discussed. It is thought that when the upper edge (oxidation potential) of the valence band is lower relative to the vacuum level (when the upper edge is higher relative to the standard hydrogen electrode potential), the oxidizing power is higher. For example, the oxidation potential of a titanium oxide measures −7.54 eV relative to the vacuum level and 3.1 V relative to the standard hydrogen electrode potential (See FIG. 2). The lower edge (reduction potential) of the conduction band of the titanium oxide is −4.34 eV relative to the vacuum level and −0.1 V relative to the standard hydrogen electrode potential. That is, the band gap of the titanium oxide measures 3.2 eV. It is conceived that for decomposing an organic substance, a material having particularly an oxidation potential higher than 1.23 V, which is the oxidation potential of water, relative to the standard hydrogen electrode potential can be used without any problems. By irradiating the material with light corresponding to its band gap, it is possible to accelerate the reaction photocatalyzed by the material. In the case of the titanium oxide, for example, the light corresponding to its band gap has a wavelength of 1240 nm/3.2 eV because the band gap of the titanium oxide is 3.2 eV. Thus, by irradiating the titanium oxide with ultraviolet rays having a wavelength of 387.5 nm or less, it is possible to make a reaction photocatalyzed by the titanium oxide. However, the reaction of decomposing water into hydrogen and oxygen by a photocatalytic reaction is a reaction toward increasing the material energy, that is, a reaction toward increasing the Gibbs free energy, and thus this reaction is equivalent to converting light energy into chemical energy potentials of hydrogen, etc. Therefore, in order to use light, such as sunlight, that includes a large amount of visible light, a band gap for absorbing visible light is needed and the level of the upper edge (oxidation potential) of the valence band and the level of the lower edge (reduction potential) of the conduction band need to be potentials between which the oxidation-reduction potential of water is present. It is necessary to narrow the band gap in order to absorb visible light, and this narrowing of the band gap raises the level of the upper edge (lowers the oxidation potential) of the valence band relative to the vacuum level, making a trade off. FIG. 2 also shows the band gap (1.1 eV), the level (oxidation potential) of the upper edge of the valence band, and the level (reduction potential) of the lower edge of the conduction band of an Si semiconductor. According to the figure, the Si semiconductor to be used for solar cells cannot decompose water. Anyway, among conventional materials, oxide semiconductors that have a narrow band gap and can make a photocatalytic reaction have not been found, except for compound semiconductors. Moreover, most of the compound semiconductors, such as CdS and CuInS, that have a narrow band gap are autooxidated (because a bond with O is stronger than a bond with S) when being irradiated with light in water, and the materials themselves are dissolved. In short, oxides that are stable in water while having a narrow band gap have not been found.

As is apparent from the description above, if hydrogen and oxygen can be produced by irradiating the material to be evaluated with visible light in water, it can be judged that this material makes a photocatalytic reaction. Such a material (an optically pumped semiconductor) that can decompose water by being irradiated with visible light can be used for solar cells because a flow of electrons and holes is generated when the material is pumped by being irradiated with the visible light. Particularly, a material obtained as a p-type semiconductor is important. When a photocatalytic electrode including the optically pumped semiconductor and a counter electrode connected electrically with the photocatalytic electrode are put in water and irradiated with light, hydrogen and oxygen are produced as presented by the following reaction formula.

Photocatalytic electrode: $4h \text{ (hole)} + 4OH^- \rightarrow O_2 + 2H_2O$

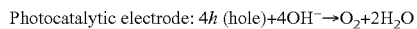

Counter electrode: $4e^- + 4H^+ \rightarrow 2H_2$

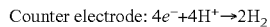

Total reaction: $4h + 4e^- + 2H_2O \rightarrow 2H_2 + O_2$ [Chemical Formula 1]

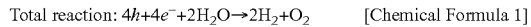

As described above, the optically pumped semiconductor according to the present invention is $BaZrO_3$, which is a base material, with Zr therein having been partly substituted by a trivalent element such as In, Ga, and Gd. Basically, the optically pumped semiconductor according to the present invention is a single phase polycrystalline body of a perovskite oxide. The crystal structure of the material was analyzed by X-ray diffraction. The result indicates that the material has a crystal system of a cubic, tetragonal, or orthorhombic crystal, and when lattice constants of the crystal system are referred to as a, b, and c, provided that a≤b≤c, conditions that 0.41727 nm≤a, b, c≤0.42716 nm and a/c≥0.98 are satisfied. The optically pumped semiconductor according to the present invention can have a density that is 96% or more of the theoretical density calculated from the crystal lattice. When the perovskite oxide according to the present invention (general formula: $BaZr_{1-x}M_xO_{3-\alpha}$) is compared with other perovskite oxides composed of an alkali earth metal element and an element such as Ti and Zr, a significant difference therebetween resides in the values of the lattice constants. The lattice constants of other perovskite oxides are as follows, for example. $CaTiO_3$ having a cubic crystal system has a lattice constant a of 0.38967 nm. $SrTiO_3$ has a lattice constant a of 0.39034 nm. $BaTiO_3$ has a lattice constant a of 0.3993 nm and a lattice constant c of 4.033 nm. $CaZrO_3$ has a lattice constant a of 0.402 nm. $SrZrO_3$ has a lattice constant a of 0.41539 nm. Compared with these, the lattice constant of $BaZrO_3$, which is 0.4127 nm, is large. However, it cannot be said that $BaZrO_3$ is a material that absorbs visible light, and $BaZrO_3$ has almost no visible light absorption band. An ultraviolet-visible light spectrophotometric analysis made on $BaZrO_3$ this time indicates that a visible light absorption band can be developed by partly substituting Zr therein by a trivalent element such as In and Ga. More specifically, it has become apparent that the resultant material is a semiconductor having a narrow band gap. In addition, when the substitution molar ratio of In or Ga (the value of x in the general formula: $BaZr_{1-x}M_xO_{3-\alpha}$) is in the range of 0.1 to 0.6 both inclusive, the material can absorb visible light with a longer wavelength (the material can have a narrower band gap), and when the ratio is in the range of 0.1 to 0.25 both inclusive, the material can absorb visible light with a wavelength of 600 nm or more (the material can have a still narrower band gap). For example, it has become apparent that $BaZr_{0.8}In_{0.2}O_{3-\alpha}$, where $\alpha$ denotes the amount of indefinite oxygen deficiency, can absorb visible light with a wavelength of 850 nm or more (with a band gap of 1.46 eV) so as to pump electrons.

The pumping of electrons is proved by the photolysis of water. This also is a photocatalytic reaction. Even when the photocatalytic material is optically pumped, the photocatalytic material cannot decompose water into hydrogen and oxygen unless the photocatalytic material has a specified level (oxidation potential) of the upper edge of the valence band and a specified level (reduction potential) of the lower edge of the conduction band as described above. Thus, the experiment of decomposing water was conducted on various materials of the optically pumped semiconductor according to the present invention. Here, powder materials are irradiated with Xe lamp light as quasi visible light to check the reaction of producing hydrogen and oxygen. In this method, when hydrogen and oxygen are produced at the same time, the hydrogen and oxygen are recombined with each other on a surface of the material, in water, or the like, making it impossible to measure their exact amounts. For this reason, the reaction is checked by a method in which a sacrificial reagent or the like is used. As a result, hydrogen and oxygen are produced with all of the materials satisfying the constituent features of the optically pumped semiconductor according to the present invention (the materials having a composition represented by the general formula: $BaZr_{1-x}M_xO_{3-\alpha}$). More specifically, it has been proved that the optically pumped semiconductor according to the present invention is a photocatalytic material having a specified level (oxidation potential) of the upper edge of the valence band and a specified level (reduction potential) of the lower edge of the conduction band, that is, the optically pumped semiconductor according to the present invention has a vacuum energy level (oxidation potential) with the level of the upper edge of the valence band being −5.67 eV or less (the oxidation potential is 1.23 V or more relative to NHE), and a vacuum energy level (reduction level) with the level of the lower edge of the conduction band being −4.44 eV or more (the reduction level is 0.0 V or less relative to NHE). This means that, with light such as sunlight, the optically pumped semiconductor according to the present invention can be used not only as a semiconductor material for solar cells but also as a photocatalytic material for decomposing water.

Figure 3A:
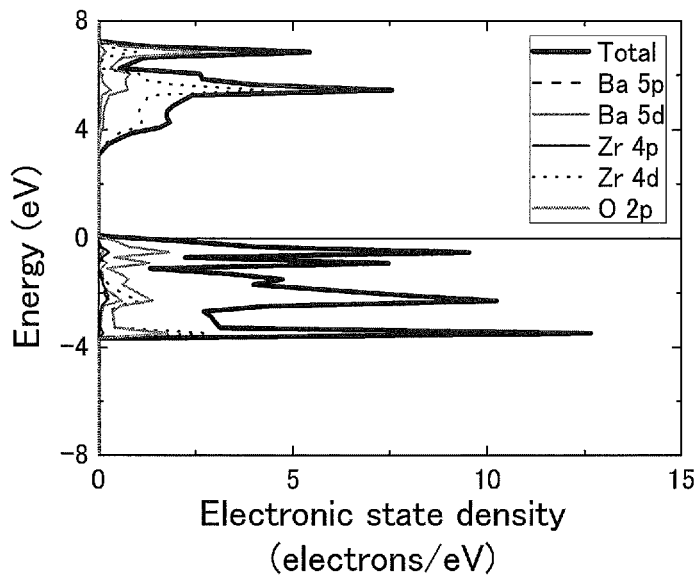
FIG. 3A is a chart showing an analysis of the band structure of $BaZrO_3$ according to the first principle.
Figure 3B:
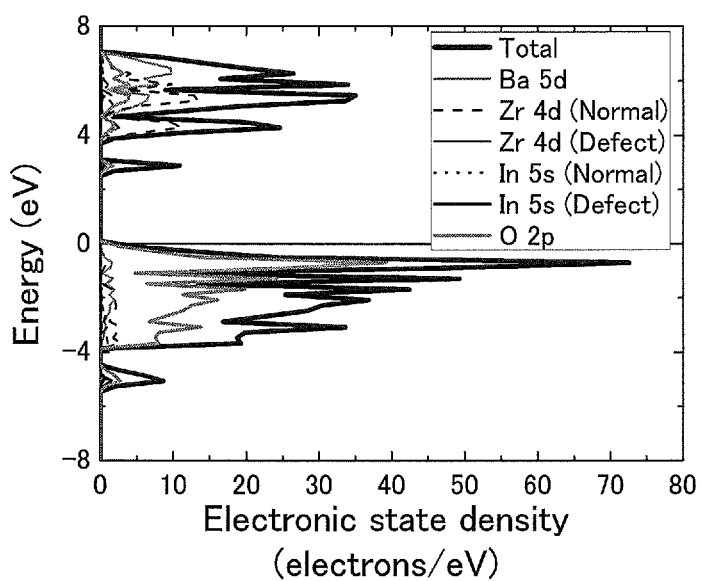
FIG. 3B is a chart showing an analysis of the band structure of a material obtained by substituting 25% of Zr in $BaZrO_3$ by In according to the first principle.

It already has been suggested that $BaZrO_3$, etc. with Zr therein not having been partly substituted by a trivalent element also exhibit the catalytic property (see Non-patent Literature 2). However, the mechanism that allows such materials to be pumped by visible light when Zr herein is partly substituted by a trivalent element (the mechanism that narrows the band gap) has not been known well yet. FIG. 3A and FIG. 3B each show the results of an analysis of the band structure according to the first principle. FIG. 3A is a chart showing the analysis of the band structure of $BaZrO_3$. FIG. 3B is a chart showing the analysis of the band structure of a material obtained by substituting 25% of Zr in $BaZrO_3$ by In. As a result of estimating an electronic state density function by a pseudopotential method, the material obtained by substituting 25% of Zr in $BaZrO_3$ by In suggests a possibility that conduction band orbits composed of a 5 s orbit of In and a 4 d orbit of Zr are created at potentials below the lower edge of the conduction band. This is surmised to be a band gap in which a visible light absorption band appears. The optically pumped semiconductor according to the present invention allows a trivalent element to be introduced thereinto while keeping the perovskite structure with a nearly cubic crystal system, and thereby oxygen vacancy, i.e., a hole, is introduced. Conceivably, oxygen deficiency is caused around Zr or the substitution element (In) and thereby empty conduction band orbits are created. An pumped electron is surmised to stay in this conduction band.

The examples of the optically pumped semiconductor according to the present invention were checked for various properties such as crystal structure, composition, ultraviolet-visible light absorption spectrophotometric property, and photocatalytic property, using the above-mentioned sintered body specimens by the following analyzing methods.

(A) Composition Analysis

A composition analysis was conducted using fluorescent X rays. The surface composition ratio of each of the sintered body specimens was calculated using an apparatus EDX-700, an energy-dispersive fluorescent X-ray analyzer manufactured by Shimadzu Corp.

(B) Crystal Structure Analysis

A crystal structure analysis was conducted as follows. The diffraction pattern of each of the specimens was observed with Rint 2100 system, a powder X-ray diffractometer (CuKα) manufactured by Rigaku Corp. Then, the lattice constant was determined by a fitting estimation based on Rietveld analysis using JADE 6.0, an integrated software for analyzing powder X-ray diffraction pattern. The above-mentioned sintered body specimens were used as the specimens.

(C) Density

The density of each of the specimens was calculated using the volume of the specimen measured with an He gas substitution type multivolume pycnometer (MICROMERITICS 1305) and the mass of the specimen measured separately. The above-mentioned sintered body specimens were used as the specimens.

(D) Ultraviolet-Visible Light Spectrophotometric Analysis

The light absorbency of each of the specimens was measured using U-650, a spectrophotometer manufactured by Jasco Corp, and analyzed by performing a Kubelka-Munk conversion. The above-mentioned sintered body specimens were used as the specimens.

(E) Constant Temperature and Humidity Test, and Boiling Durability Test

In a constant temperature and humidity test, the above-mentioned sintered body specimens were left at 85° C. and 85% RH (Relative Humidity), and the surface deterioration thereof was observed. In a boiling durability test, the sintered body specimens were put into water at pH 7 and 100° C., and the degree of dissolution thereof was observed by checking pH for up to 100 hours. The temperature was once lowered to measure the pH at 25° C. using F14, a pH meter manufactured by Horiba Ltd.

(F) Photocatalytic Property and Optically Pumped Semiconductor

As the method for checking the photocatalytic property, there are several ways such as decomposing an organic substance and measuring a contact angle. However, in the present embodiment, the specimens were irradiated directly with xenon lamp light (at 300 W and 20 V) having a continuous spectrum with a wavelength of 420 nm to 800 nm, or with a mercury vapor lamp light (254 nm) for pumping the specimens with ultraviolet rays, to check the photocatalytic property by directly decomposing water that is most difficult to be oxidized and reduced. When the specimens can decompose water, it means that they are materials capable of decomposing organic substances as well. Furthermore, when the specimens can decompose water, it means that they are materials capable of oxidizing directly or reducing directly organic substances. Of course, the occurrence of oxidation and reduction indicates the fact that electrons are received from and supplied to the specimens, thereby proving that the specimens are optically pumped semiconductors.

The evaluation was made by checking the amounts of hydrogen and oxygen produced when the powdered specimens each was dispersed in an aqueous solution and irradiated with light. Conceivably, the reactions of producing hydrogen and oxygen proceed at the same time on a material surface of the specimen. Thus, taking into consideration the recombination of hydrogen with oxygen on the material surface, in a liquid, and during the collection of the gases, a sacrificial reagent that compensates one of the oxidation reaction and the reduction reaction was used, and the amounts of hydrogen and oxygen produced were measured separately. As the sacrificial reagent for checking the production of hydrogen, a 10 vol % methanol aqueous solution was used. As the sacrificial reagent for checking the production of oxygen, A 0.01 M (mol/L) an $AgNO_3$ aqueous solution was used.

The powdered specimen used for producing hydrogen was (about 0.2 g of) powder with a particle diameter of about 10 μm or less prepared by dry-grinding the sintered body specimen in a mortar for about 1 hour. The specimen used for producing hydrogen was impregnated and fixed with a 1 wt % Pt co-catalyst for accelerating further the catalytic activity.

Figure 4:
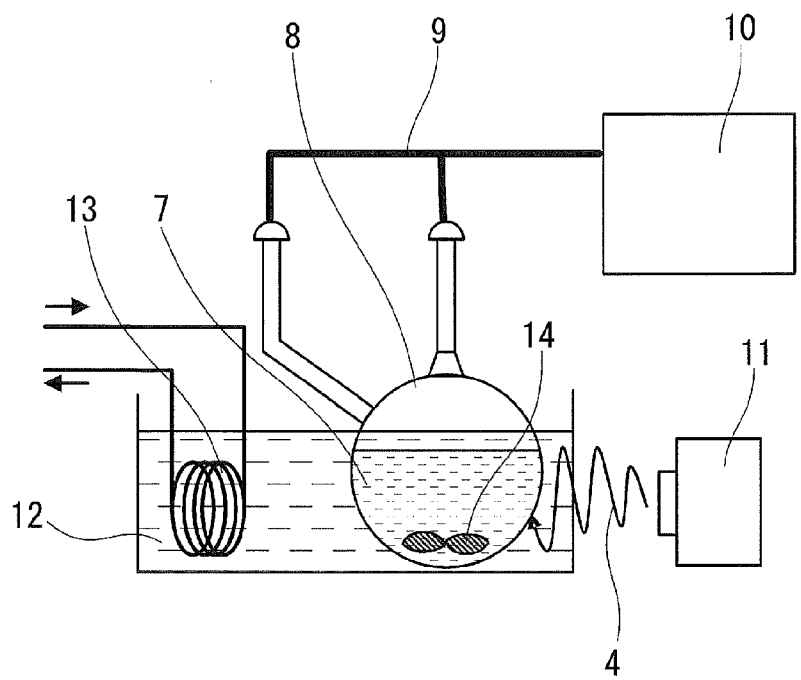
FIG. 4 is a schematic view of an experimental system for producing hydrogen.

The experiment was conducted using the experimental system shown in FIG. 4.

When observing the production of hydrogen, an aqueous solution obtained by adding 10 mL of $AgNO_3$ and 0.2 g of $La_2O_3$ serving as a pH adjustor into 200 mL of distilled water was used. A dispersion 7 prepared by mixing this aqueous solution with about 0.2 g of the powdered specimen was supplied to a sealable quartz cell 8 so that a stirrer (magnetic stirrer) 14 can stir it. When observing the production of oxygen, an aqueous solution obtained by adding 20 mL of methanol into 180 mL of distilled water was used.

As shown in FIG. 4, in the experiment, the dispersion 7 was irradiated with the light 4 from a lateral side of the quartz cell 8 by using a light source 11 (the xenon lamp (the mercury-vapor lamp when observing the pumping with ultraviolet rays)), and the amounts of hydrogen and oxygen produced were measured every one hour using a gas chromatography (GC-14b, manufactured by Shimadzu Corp.) 10, with a TCD (Thermal Conductivity Detector). The hydrogen or oxygen produced in the quartz cell 8 was sent to the gas chromatography 10, which is a gas analyzer, through a gas line 9. In order to keep the water temperature constant, the quartz cell 8 itself was cooled in a thermostatic bath 12 having a cooling system 13.

EXAMPLES

Hereinafter, the optically pumped semiconductor according to the present invention will be described with reference to examples. However, the optically pumped semiconductor according to the present invention is not limited at all by these examples.

Example 1

In Example 1, a material having a composition of $BaZr_{0.9}In_{0.1}O_{3-\alpha}$ was synthesized. As the production method, the above-mentioned high temperature solid phase reaction was used for synthesizing the material. Powder materials of barium acetate, zirconium hydroxide, and an indium oxide were mixed together so that the composition ratio of Ba:Zr:In was 1:0.9:0.1, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1400° C. for 12 hours (pre-firing). The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was fired at 1675° C. for 10 hours (main firing). Thus, a sintered body was produced.

Example 2

In Example 2, a material having a composition of $BaZr_{0.875}In_{0.125}O_{3-\alpha}$ was synthesized. The material of Example 2 was synthesized in the same manner as in Example 1, except that the powder materials of barium acetate, zirconium hydroxide, and an indium oxide were mixed together so that the composition ratio of Ba:Zr:In was 1:0.875:0.125.

Example 3

In Example 3, a material having a composition of $BaZr_{0.8}In_{0.2}O_{3-\alpha}$ was synthesized. The material of Example 3 was synthesized in the same manner as in Example 1, except that the powder materials of barium acetate, zirconium hydroxide, and an indium oxide were mixed together so that the composition ratio of Ba:Zr:In was 1:0.8:0.2.

Example 4

In Example 4, a material having a composition of $BaZr_{0.6}In_{0.4}O_{3-\alpha}$ was synthesized. The powder materials of barium acetate, zirconium hydroxide, and an indium oxide were mixed together so that the composition ratio of Ba:Zr:In was 1:0.6:0.4, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1300° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was sintered at 1550° C. for 10 hours. Thus, a sintered body was produced.

Example 5

In Example 5, a material having a composition of $BaZr_{0.4}In_{0.6}O_{3-\alpha}$ was synthesized. The powder materials of barium acetate, zirconium hydroxide, and an indium oxide were mixed together so that the composition ratio of Ba:Zr:In was 1:0.4:0.6, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1000° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was sintered at 1300° C. for 10 hours. Thus, a sintered body was produced.

Example 6

In Example 6, a material having a composition of $BaZr_{0.8}Ga_{0.2}O_{3-\alpha}$ was synthesized. The powder materials of barium acetate, zirconium hydroxide, and a gallium oxide were mixed together so that the composition ratio of Ba:Zr:Ga was 1:0.8:0.2, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1050° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was sintered at 1650° C. for 10 hours. Thus, a sintered body was produced.

Example 7

In Example 7, a material having a composition of $BaZr_{0.8}Gd_{0.2}O_{3-\alpha}$ was synthesized. The powder materials of barium acetate, zirconium hydroxide, and gadolinium oxide were mixed together so that the composition ratio of Ba:Zr:Gd was 1:0.8:0.2, and crushed and mixed using an ethanol solvent in an agate mortar. After sufficient mixing, the solvent was removed from the mixture, and the resultant was defatted with a burner, and then crushed and mixed again repeatedly in the agate mortar. Thereafter, the mixture was press-molded into a cylindrical shape and fired at 1300° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was fired at 1650° C. for 10 hours. Thus, a sintered body was produced.

Comparative Example 1

In Comparative Example 1, a material having a composition of $BaZrO_{3-\alpha}$ was synthesized. The material of the present comparative example was synthesized in the same manner as in Example 1, except that the powder materials of barium acetate and zirconium hydroxide were mixed together so that the composition ratio of Ba:Zr was 1:1.

Comparative Example 2

In Comparative Example 2, a material having a composition of $BaZr_{0.2}In_{0.8}O_{3-\alpha}$ was synthesized. The powder materials of barium acetate, zirconium hydroxide, and an indium oxide were mixed together so that the composition ratio of Ba:Zr:In was 1:0.2:0.8, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1000° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² and molded into a cylindrical shape. Immediately thereafter, it was fired at 1100° C., 1200° C., or 1300° C. for 10 hours. Thus, a sintered body was produced.

Comparative Example 3

In Comparative Example 3, a material having a composition of $BaZr_{0.5}Ce_{0.5}O_{3-\alpha}$ was synthesized. The powder materials of barium acetate, zirconium hydroxide, and a cerium oxide were mixed together so that the composition ratio of Ba:Zr:Ce was 1:0.5:0.5, and crushed and mixed using an ethanol solvent in an agate mortar. After sufficient mixing, the solvent was removed from the mixture, and the resultant was defatted with a burner, and then crushed and mixed again repeatedly in the agate mortar. Thereafter, the mixture was press-molded into a cylindrical shape and fired at 1350° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was fired at 1650° C. for 10 hours. Thus, a sintered body was produced.

Comparative Example 4

In Comparative Example 4, a material having a composition of $BaZr_{0.35}In_{0.65}O_{3-\alpha}$ was synthesized. The powder materials of barium acetate, zirconium hydroxide, and an indium oxide were mixed together so that the composition ratio of Ba:Zr:In was 1:0.35:0.65, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1000° C. for 12 hours. The fired material was coarsely ground, and then was subject to planetary ball mill crushing in a benzene solvent or a cyclohexane solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was fired at 1500° C. for 10 hours. Thus, a sintered body was produced.

Comparative Example 5

In Comparative Example 5, a material having a composition of $BaZr_{0.76}Gd_{0.24}O_{3-\alpha}$ was synthesized. The powder materials of barium acetate, zirconium hydroxide, and a gadolinium oxide were mixed together so that the composition ratio of Ba:Zr:Gd was 1:0.76:0.24, and crushed and mixed using an ethanol solvent in an agate mortar. After sufficient mixing, the solvent was removed from the mixture, and the resultant mixture was defatted with a burner, and then crushed and mixed again repeatedly in the agate mortar. Thereafter, the mixture was press-molded into a cylindrical shape and fired at 1200° C. for 12 hours. The fired material was coarsely ground, and then was subject to planetary ball mill crushing in a benzene solvent and granulated to have a particle diameter of 3 μm or less (actually measured with a particle size distribution meter). The obtained powder was vacuum-dried at 150° C., and then uniaxially pressed and hydrostatically pressed at 2 ton/cm² to be formed into a cylindrical shape. Immediately thereafter, it was fired at 1675° C. for 10 hours. Thus, a sintered body was produced.

The materials of Examples 1 to 7 and Comparative Examples 1 to 5 were analyzed using the above-mentioned methods of (A) Composition analysis, (B) Crystal structure analysis, (C) Density, (D) Ultraviolet-visible light spectrophotometric analysis, (E) Constant temperature and humidity test, and (F) Photocatalytic property.

(1) Results of Composition Analysis (Fluorescent X-ray Surface Composition Analysis)

Table 1 below shows collectively the preparation compositions and synthesized compositions in Examples 1 to 7 and Comparative Examples 1 to 5.

TABLE 1

| | Preparation composition | Synthesized composition |
|---|---|---|
| Example 1 | $BaZr_{0.9}In_{0.1}O_{3-\alpha}$ | $BaZr_{0.9}In_{0.1}O_{3-\alpha}$ |
| Example 2 | $BaZr_{0.875}In_{0.125}O_{3-\alpha}$ | $BaZr_{0.875}In_{0.125}O_{3-\alpha}$ |
| Example 3 | $BaZr_{0.8}In_{0.2}O_{3-\alpha}$ | $BaZr_{0.8}In_{0.2}O_{3-\alpha}$ |
| Example 4 | $BaZr_{0.6}In_{0.4}O_{3-\alpha}$ | $BaZr_{0.61}In_{0.39}O_{3-\alpha}$ |
| Example 5 | $BaZr_{0.4}In_{0.6}O_{3-\alpha}$ | $BaZr_{0.45}In_{0.55}O_{3-\alpha}$ |
| Example 6 | $BaZr_{0.8}Ga_{0.2}O_{3-\alpha}$ | $BaZr_{0.8}Ga_{0.2}O_{3-\alpha}$ |
| Example 7 | $BaZr_{0.8}Gd_{0.2}O_{3-\alpha}$ | $BaZr_{0.8}Gd_{0.2}O_{3-\alpha}$ |
| C. Example 1 | $BaZrO_{3-\alpha}$ | $BaZrO_{3-\alpha}$ |
| C. Example 2 | $BaZr_{0.2}In_{0.8}O_{3-\alpha}$ | Not synthesizable (crack) |
| C. Example 3 | $BaZr_{0.5}Ce_{0.5}O_{3-\alpha}$ | $BaZr_{0.5}Ce_{0.5}O_{3-\alpha}$ |
| C. Example 4 | $BaZr_{0.35}In_{0.65}O_{3-\alpha}$ | $BaZr_{0.39}In_{0.61}O_{3-\alpha}$ |
| C. Example 5 | $BaZr_{0.76}Gd_{0.24}O_{3-\alpha}$ | $BaZr_{0.76}Gd_{0.24}O_{3-\alpha}$ |

Figure 5:
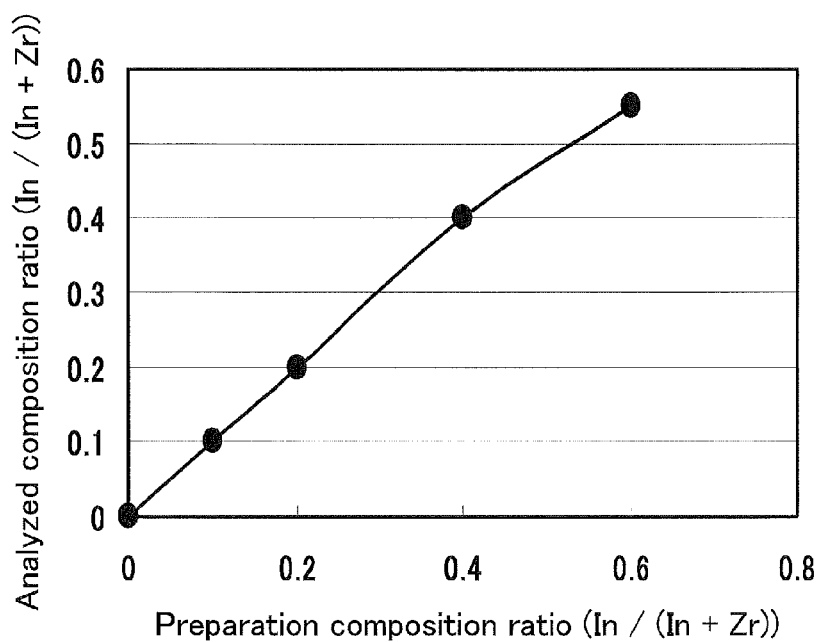
FIG. 5 is a correlation diagram between a preparation composition and a synthesized composition in an example of the optically pumped semiconductor according to the present invention.

The results of Examples 1 to 4 indicate that about a material with Zr therein having been substituted by a substitute that is In, the material was synthesized to have a composition almost the same as the preparation composition, when the content of the substitute is up to 40 mol %. Moreover, the result of Example 5 indicates that even when the content of the substitute was 60 mol % in the preparation composition, the substitution was made only up to about 55 mol %. Furthermore, the result of Comparative Example 2 indicates that when the content of the substitute was 80 mol % in the preparation composition, the synthesis was impossible in the case of using the solid phase method. FIG. 5 shows a relationship between the preparation composition and the synthesized composition in each of Examples 1 to 5.

(2) Results of Crystal Structure Analysis and Density

Figure 6:
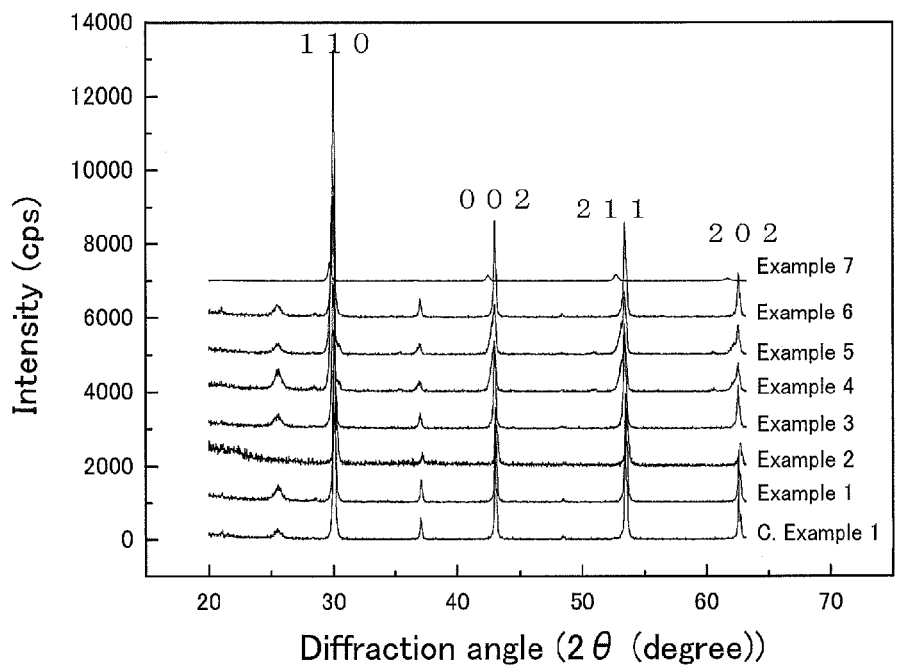
FIG. 6 is a chart showing X-ray diffraction patterns of examples and a comparative example of the optically pumped semiconductor according to the present invention.
Figure 7:
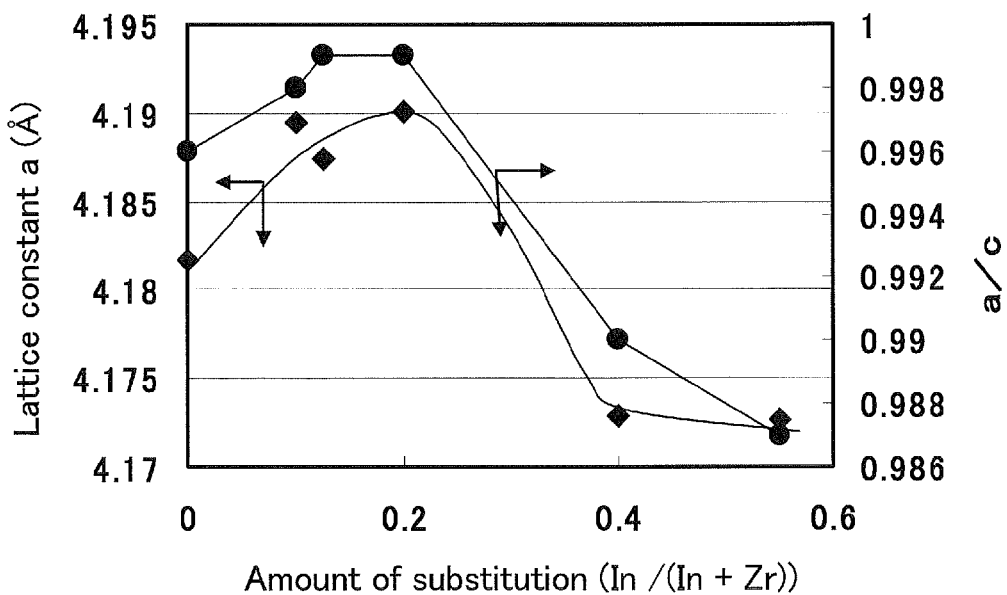
FIG. 7 is a chart showing dependencies of a lattice constant a and a/c on the composition ratio in the examples of the optically pumped semiconductor according to the present invention.

FIG. 6 shows the X-ray diffraction patterns of Examples 1 to 7 and Comparative Example 1. Table 2 shows: the crystal system estimated by parameter fitting based on Rietveld analysis; the lattice constants a, b, and c; a/c; and the ratio of the density to a theoretical density. FIG. 7 shows the dependencies of the lattice constant a and a/c on the composition ratio.

Furthermore, their X-ray diffraction patterns did not change at all between before and after the test. This means that their compositions, perovskite single phases, and crystal structures were maintained. In the boiling durability test, their maximum values of pH did not exceed 9 for 100 hours and they were stable.

(5) Results of Photocatalytic Property

Figure 10A:
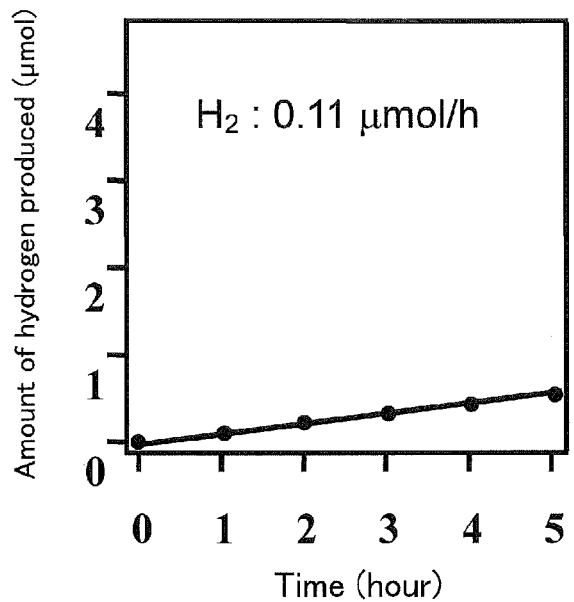
FIG. 10A is a chart showing hydrogen producing property of the optically pumped semiconductor of Example 1.
Figure 10B:
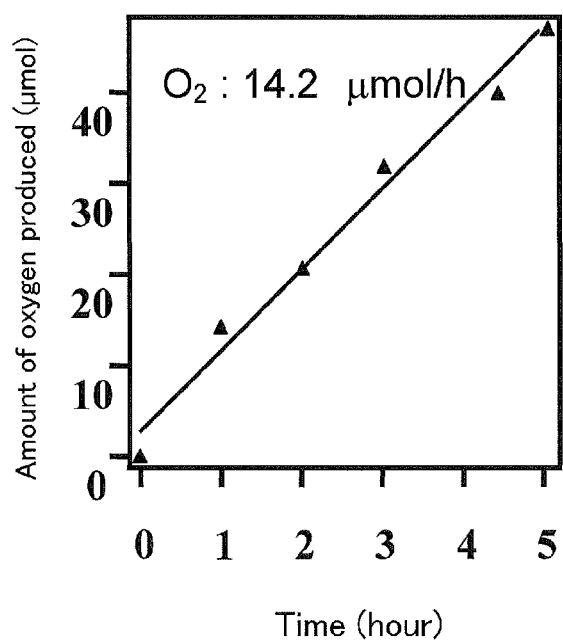
FIG. 10B is a chart showing oxygen producing property of the optically pumped semiconductor of Example 1, when the optically pumped semiconductor is irradiated with ultraviolet rays (400 nm or less).
Figure 11A:
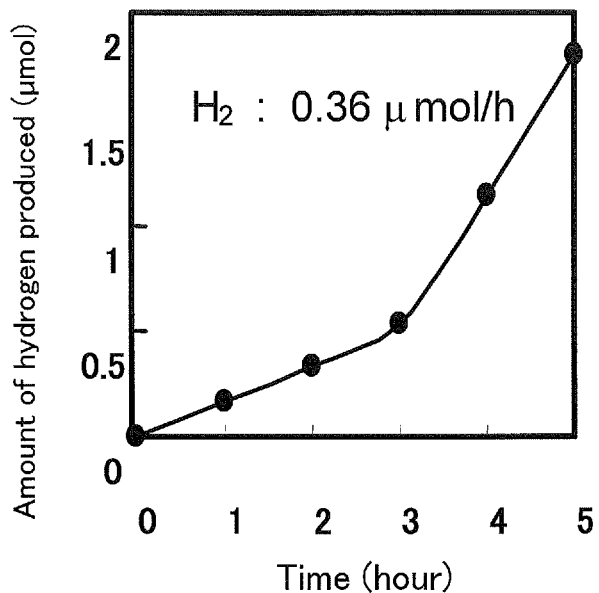
FIG. 11A is a chart showing hydrogen producing property of the optically pumped semiconductor of Example 3.
Figure 11B:
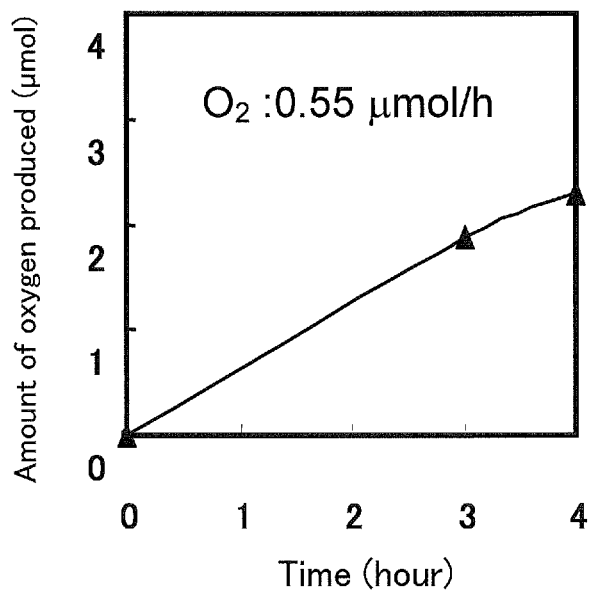
FIG. 11B is a chart showing oxygen producing property of the optically pumped semiconductor of Example 3, when the optically pumped semiconductor is irradiated with visible light (420 nm to 800 nm).

With respect to the materials of Examples 1 to 7 and Comparative Examples 1, and 3 to 5, the photocatalytic property was clarified by checking the amounts of hydrogen and oxygen produced when water was decomposed under light irradiation. First, by using a mercury-vapor lamp (with a wavelength of 254 nm) as the light source, it was confirmed that all of the materials of Examples 1 to 7 had catalytic activity and they were optically pumped semiconductors. FIG. 10A and FIG. 10B show the results of a study on the material of Example 1 in terms of the characteristics in producing hydrogen and oxygen using a mercury-vapor lamp (ultraviolet rays, with a wavelength of 400 nm or less). FIG. 11A and FIG. 11B

TABLE 2

|  | a (Å) | b (Å) | c (Å) | Crystal system | a/c | Volume (Å$^3$) | Calculation density (g/cm$^3$) | Synthesis density (g/cm$^3$) | Ratio of density |
|---|---|---|---|---|---|---|---|---|---|
| Example 1 | 4.1895 | 4.1953 | 4.2000 | Orthorhombic crystal | 0.997 | 73.84 | 6.27 | 6.16 | 98% |
| Example 2 | 4.1874 | 4.1874 | 4.1901 | Cubic crystal | 0.999 | 73.47 | 6.28 | 6.14 | 98% |
| Example 3 | 4.1901 | 4.1901 | 4.1949 | Cubic crystal | 0.999 | 73.78 | 6.33 | 6.13 | 97% |
| Example 4 | 4.1729 | 4.1841 | 4.2160 | Orthorhombic crystal | 0.990 | 73.66 | 6.45 | 6.31 | 98% |
| Example 5 | 4.1727 | 4.1938 | 4.2264 | Orthorhombic crystal | 0.987 | 73.61 | 6.56 | 6.44 | 98% |
| Example 6 | 4.1862 | 4.1935 | 4.1988 | Orthorhombic crystal | 0.997 | 73.80 | 6.13 | 6.10 | 99% |
| Example 7 | 4.2566 | 4.2595 | 4.2617 | Orthorhombic crystal | 0.999 | 77.27 | 6.23 | 6.22 | 99% |
| C. Example 1 | 4.1817 | 4.1890 | 4.1981 | Orthorhombic crystal | 0.996 | 73.54 | 6.24 | 5.99 | 96% |
| C. Example 2 |  |  |  | Unsynthesizable (crack) |  |  |  |  |  |
| C. Example 3 | 3.5142 | 4.2982 | 6.0727 | Orthorhombic crystal | 0.708 | 91.73 | 5.45 | 5.34 | 98% |
| C. Example 4 | 4.1668 | 4.1722 | 4.2324 | Orthorhombic crystal | 0.986 | 73.58 | 6.56 | 6.43 | 98% |
| C. Example 5 | 4.2536 | 4.2688 | 4.37 | Orthorhombic crystal | 0.973 | 79.35 | 6.12 | 5.88 | 96% |

(3) Results of Ultraviolet-Visible Light Spectrophotometric Analysis

Figure 8A:
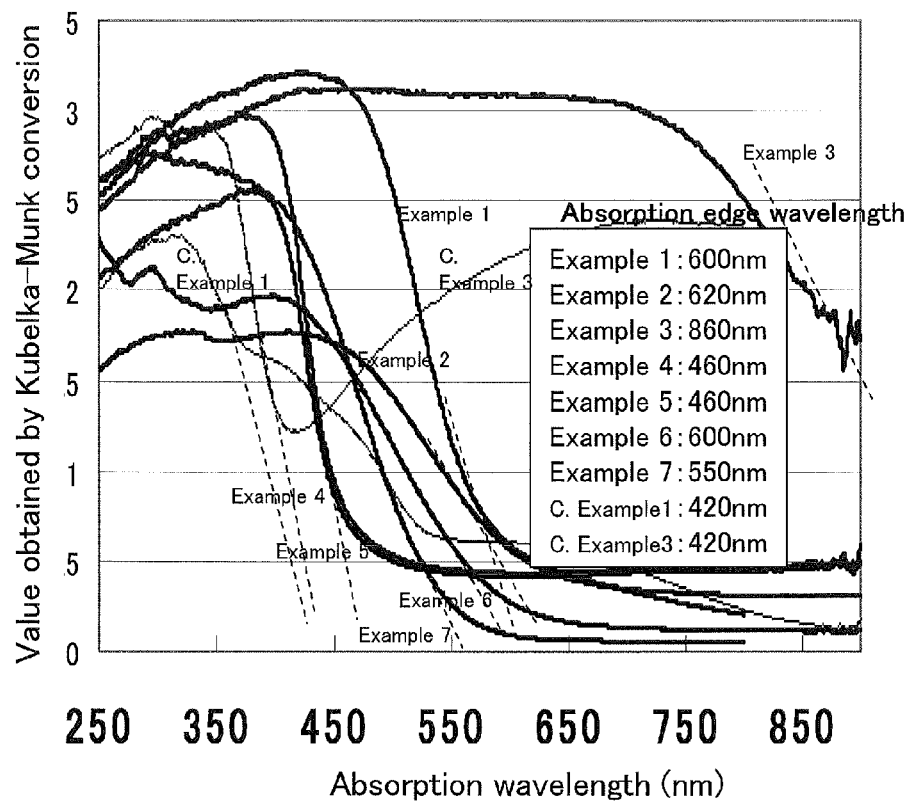
FIG. 8A is a chart showing the results of ultraviolet-visible light spectrophotometric analysis of the examples and comparative examples of the optically pumped semiconductor according to the present invention.
Figure 8B:
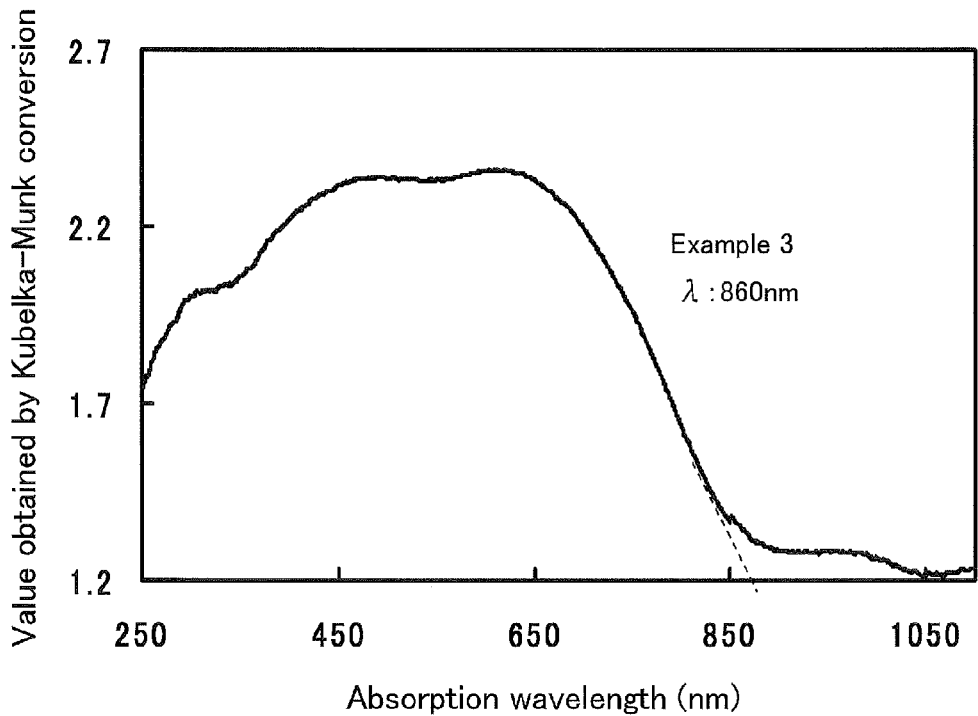
FIG. 8B is a chart showing the result of ultraviolet-visible light spectrophotometric analysis of Example 3.
Figure 9:
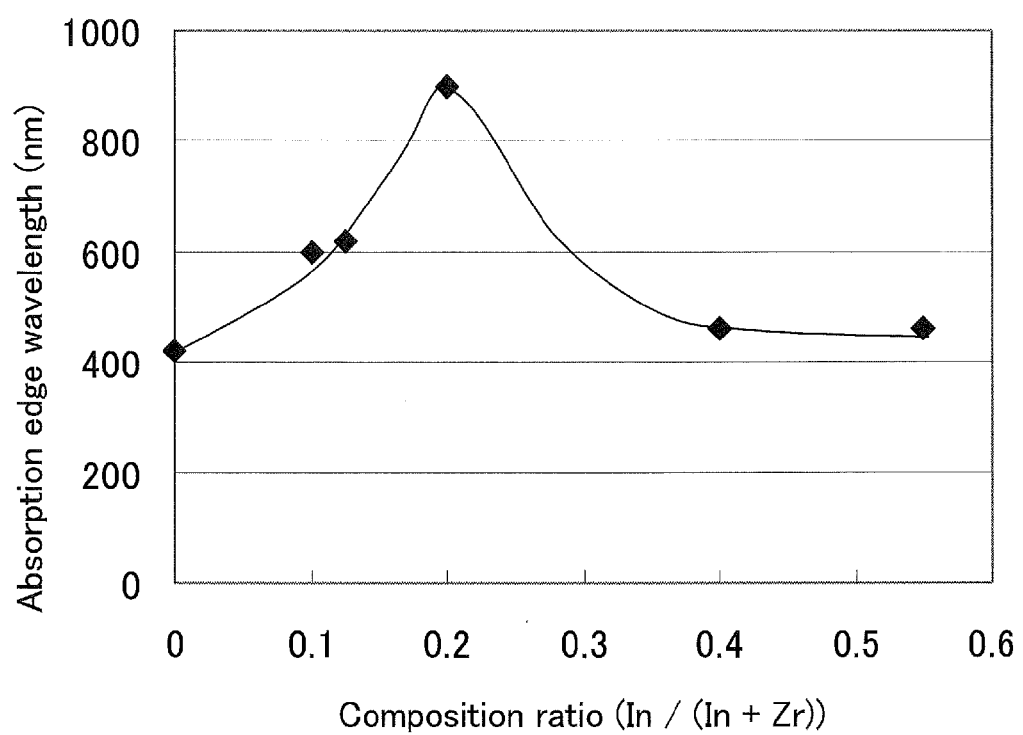
FIG. 9 is a chart showing a relationship between a composition ratio of the optically pumped semiconductor according to the present invention and a visible light absorption edge wavelength.

FIG. 8A and FIG. 8B show the results of ultraviolet-visible light spectrophotometric analysis of the materials of Examples 1 to 7 and Comparative Examples 1 and 3. FIG. 8A and FIG. 8B do not show the results on the materials of Comparative Examples 4 and 5, but as a result of an analysis, the absorption edge wavelength of the material of Comparative Example 4 was about 450 nm, and the absorption edge wavelength of the material of Comparative Example 5 was about 420 nm. Thus, it was impossible for the materials of Comparative Examples 4 and 5 to absorb visible light with a wavelength of 460 nm or more. FIG. 9 shows a relationship between the composition ratio and the visible light absorption edge wavelength of each of the materials of Examples 1 to 5 and Comparative Example 1.

(4) Results of Constant Temperature and Humidity Test and Boiling Durability Test The materials of Examples 1 to 7 were subject to a constant temperature and humidity test (at 85° C. and 85% RH) for 10000 hours, and as a result, there were no visible changes found with the materials between before and after the test.

show the results of a study on the material of Example 3 in terms of the characteristics in producing hydrogen and oxygen using xenon lamp light (at 300 W and 20 V) having a continuous spectrum of 420 nm to 800 nm with the wavelength of 420 nm or less being cut. Table 3 below shows the production rates of hydrogen and oxygen in the case of using the xenon lamp light.

TABLE 3

|  | Production rate of hydrogen (μmol/h) | Production rate of oxygen (μmol/h) |
|---|---|---|
| Example 1 | 0.21 | 0.25 |
| Example 2 | 0.20 | 0.18 |
| Example 3 | 0.36 | 0.55 |
| Example 4 | 0.06 | 0.10 |
| Example 5 | 0.06 | 0.12 |
| Example 6 | 0.18 | 0.31 |
| Example 7 | 0.12 | 0.10 |
| C. Example 1 | 0 | 0 |
| C. Example 3 | 0 | 0 |
| C. Example 4 | 0 | 0 |
| C. Example 5 | 0 | 0 |

From the results above, it has been confirmed that the reactions of producing hydrogen and oxygen occur under the irradiation with ultraviolet rays and visible light in the case of using the materials of Examples 1 to 7 satisfying the constituent features of the present invention. This proves that electron transfer occurs theoretically in the materials of Examples 1 to 7 under irradiation with light (including ultraviolet rays and visible light). And the materials of Examples 1 to 7 each were confirmed to be an optically pumped semiconductor that functions also as a photocatalyst. Particularly, the materials of Examples 1 to 7 according to the present invention each were proved to have visible light responsiveness by a xenon lamp (having a wavelength of 420 nm to 800 nm) and verified to be a visible-light-pumped photocatalyst as well as a visible-light-pumped semiconductor.

From the results shown in the aforementioned (1) to (5), it has been confirmed that a material that is a semiconductor of a perovskite oxide, wherein the optically pumped semiconductor has a composition represented by the general formula: $BaZr_{1-x}M_xO_{3-\alpha}$ where M denotes at least one element selected from trivalent elements (for example, at least one element selected from the group consisting of In, Ga, and Gd), x denotes a numerical value more than 0 but less than 0.8, and $\alpha$ denotes an amount of oxygen deficiency that is a numerical value more than 0 but less than 1.5, and has a crystal system of a cubic, tetragonal, or orthorhombic crystal, and when lattice constants of the crystal system are referred to as a, b, and c, provided that $a \leq b \leq c$, conditions that $0.41727$ nm $\leq a$, b, $c \leq 0.42716$ nm and $a/c \geq 0.98$ are satisfied, has the catalytic activity and optically pumped semiconductor property. Particularly, the material has been found to be a material for which light, such as sunlight and fluorescent lamp light, in a visible light range (460 nm or more) can be used effectively. From the relationship between the composition ratio and the visible light absorption edge wavelength shown in FIG. 9, it has been found that an optically pumped semiconductor that is optically pumped with visible light having a wavelength of 600 nm or more can be obtained by setting the value x in the general formula: $BaZr_{1-x}M_xO_{3-\alpha}$ within the range of 0.125 to 0.25 both inclusive.

Subsequently, in order to see a relationship between the density and water resistance, there were produced materials of Examples 8 to 13 having the same composition ($BaZr_{0.8}In_{0.2}O_{3-\alpha}$) as that of Example 3 but having different densities from that of Example 3. In Examples 8 to 13, the methods of pre-firing and main firing were different from those used in Example 3, but the other methods were the same as in Example 3. The methods of pre-firing and main firing used in Examples 8 to 13 were as shown in Table 4.

TABLE 4

| | Pre-firing | | Main firing | | |
|---|---|---|---|---|---|
| | Temperature (° C.) | Time (hour) | Temperature (° C.) | Time (hour) | Pressure |
| Example 8 | 1300 | 12 | 1650 | 10 | Uniaxial and hydrostatic pressure 2 ton/cm$^2$ |
| Example 9 | 1400 | 12 | 1550 | 10 | Uniaxial pressure 23.6 kg/cm$^2$ |
| Example 10 | 1400 | 12 | 1650 | 10 | Uniaxial pressure 23.6 kg/cm$^2$ |
| Example 11 | 1350 | 12 | 1650 | 10 | Uniaxial pressure 23.6 kg/cm$^2$ |
| Example 12 | 1400 | 12 | 1650 | 12 | Uniaxial pressure 139 kg/cm$^2$ |
| Example 13 | 1400 | 10 | 1650 | 50 | Uniaxial pressure 1.2 ton/cm$^2$ |

Examples 8 to 13 were subject to the density analysis and the constant temperature and humidity test in the same manner as in the other Examples and Comparative Examples. Table 5 shows the ratio of the density to the theoretical density, and the results of the constant temperature and humidity test and the boiling durability test. Table 5 also shows the ratio of the density to the theoretical density and the results of the constant temperature and humidity test and the boiling durability test of Example 3.

TABLE 5

| | Ratio of density | Constant temperature and humidity test (85° C. and 85% RH) | Boiling durability test (duration for which pH value did not exceed 9) |
|---|---|---|---|
| Example 3 | 97% | No change was observed. | 100 hours or more |
| Example 8 | 96% | No change was observed. | 100 hours or more |
| Example 9 | 43% | Surface discoloration (whitening) was observed. | 6 hours |
| Example 10 | 57% | Surface discoloration (whitening) was observed. | 18 hours |
| Example 11 | 86% | Surface discoloration (whitening) was observed. | 52 hours |
| Example 12 | 93% | Surface discoloration (whitening) was observed. | 75 hours |
| Example 13 | 94% | Surface discoloration (whitening) was observed. | 91 hours |

The results shown in Table 5 indicate that an optically pumped semiconductor with higher water resistance can be obtained when the ratio of the density to the theoretical density is set to 96% or more.

The present example showed examples of barium zirconate, which is a base material, with Zr therein having been partly substituted by a trivalent element of In, Ga, or Gd. The amount of substitution (the value x in the general formula: $BaZr_{1-x}M_xO_{3-\alpha}$) was 0.1, 0.125, 0.2, 0.4, or 0.6 in the case of In, 0.2 in the case of Ga, and 0.2 in the case of Gd. The amount of substitution in the case of In may be 0.05 or 0.25, and the amounts of substitution in the case of Ga and Gd are not limited to these examples, either. As the trivalent substitution element, a rare earth element, Y, Sc, Al, B, and Tl can be considered. Conceivably, oxygen deficiency was caused by substituting a tetravalent zirconium ion in barium zirconate by a trivalent ion, and the electronic state density around Zr (4d orbit of Zr) was reduced, and as a result, an empty conduction band appeared. The material according to the present invention basically is composed of four elements of Ba, Zr, M (a trivalent element), and O, but it is conceivable that the material has a composition containing Si, Al, or Na as an impurity or has a composition further containing a trivalent substitution element that is an accessory component. Basically, the same effects can be obtained in the case of using a material that is obtained by partly substituting zirconium in barium zirconate by a trivalent element and has crystal structure constants satisfying the requirements according to the present invention. In the present example, the method for synthesizing the material was basically a method in which the firing was performed repeatedly to synthesize the material into a sintered body. However, it is possible to use, for example; a film formed by spattering, vapor deposition, thermal spraying, ion plating, coating, plating, and a gas phase method such as CVD; and a material obtained by a coprecipitation method, a sol gel method, and a solution method using an organometallic compound. Moreover, the firing temperature and the pressure are not specified, either, and a hydrothermal synthesis method may be used. The finished optically pumped semiconductor according to the present invention may be provided in a form of several-micron particles, nanoparticles, a thick film, or a thin film.

Embodiment 2

One embodiment of the device according to the present invention will be described. In the present embodiment, a description will be made with respect to an example of a device that is provided with powder or a film including the optically pumped semiconductor according to the present invention. In the device, the optically pumped semiconductor is irradiated with light so as to decompose water and produce at least one of hydrogen and oxygen.

Figure 12A:
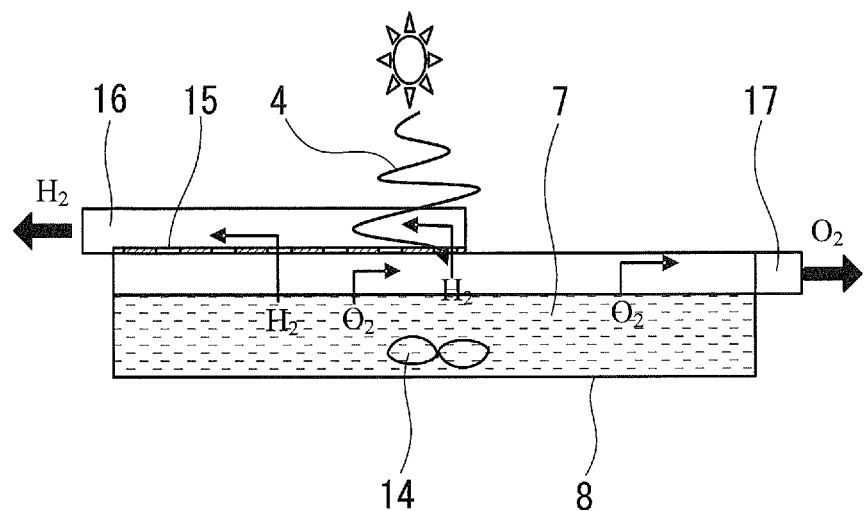
FIG. 12A is a schematic view showing an example of a hydrogen producing device for which sunlight can be used.
Figure 12B:
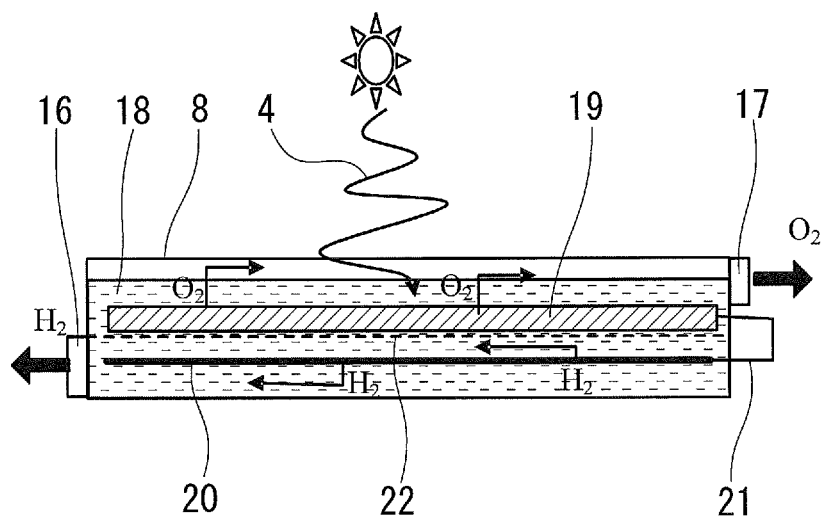
FIG. 12B is a schematic view showing another example of the hydrogen producing device for which sunlight can be used.

The device of the present embodiment is a high-performance hydrogen producing device using the optically pumped semiconductor according to the present invention as described in Embodiment 1. FIG. 12A and FIG. 12B each show a schematic view of an example of the hydrogen producing device for which sunlight is used.

The hydrogen producing device shown in FIG. 12A includes: a light source (sunlight or a fluorescent lamp, for example) that emits visible light with a wavelength of at least 460 nm or more; a dispersion 7 obtained by dispersing, in water serving as a source of hydrogen and oxygen, powder of the optically pumped semiconductor according to the present invention that absorbs the light 4 emitted from the light source and makes a catalytic reaction; the quartz cell 8 holding the dispersion 7; a separation film 15 for separating the gases produced; tanks (not shown) in which the gases are collected; and gas pipes 16 and 17 connecting the quartz cell 8 to the tanks, respectively. The quartz cell 8 is formed of a material that allows the light 4 emitted from the light source to transmit therethrough. In the hydrogen producing device of the present embodiment, the dispersion 7 (the optically pumped semiconductor according to the present invention) held in the quartz cell 8 is irradiated with the light 4 so that the optically pumped semiconductor in the dispersion 7 decomposes water to produce hydrogen and oxygen. The produced hydrogen and oxygen are separated from each other with the separation film 15 and stored in the tanks, respectively.

The hydrogen producing device shown in FIG. 12B is an example in which the optically pumped semiconductor according to the present invention is provided as an electrode. Such an electrode can be produced by forming the optically pumped semiconductor according to the present invention into a film and disposing the film on a metal substrate, or on a substrate that is composed of an oxide, glass, or the like and is provided in advance with a conductive current collector such as an ITO and an FTO (a fluorine doped tin oxide). The hydrogen producing device shown in FIG. 12B includes: an electrode (photocatalytic electrode) 19 including the optically pumped semiconductor according to the present invention; a counter electrode 20 connected electrically to the electrode 19 with a conducting wire 21; water 18 serving as a source of hydrogen and oxygen; a salt bridge 22 disposed between the electrode 19 and the counter electrode 20; the quartz cell 8 accommodating these components; tanks (not shown) for collecting gases; and the gas pipes 16 and 17 connecting the quartz cell 8 to the tanks, respectively. Platinum or the like is used for the counter electrode 20, but another metal also can be used as long as it can produce hydrogen.

Embodiment 3

In the present embodiment, a description will be made with respect to a solar cell that is a device in which the optically pumped semiconductor according to the present invention as described in Embodiment 1 is used and the optically pumped semiconductor is irradiated with light so as to generate electricity.

Usually, a solar cell has a structure in which a p-type semiconductor and a n-type semiconductor are bonded to each other. Since the optically pumped semiconductor according to the present invention can be used as a p-type semiconductor, it is possible to fabricate a solar cell by bonding the optically pumped semiconductor to an n-type semiconductor and connecting an conducting wire of an external circuit thereto. By irradiating this solar cell with sunlight or fluorescent lamp light, it is possible to extract current from the solar cell to the external circuit.

Figure 13:
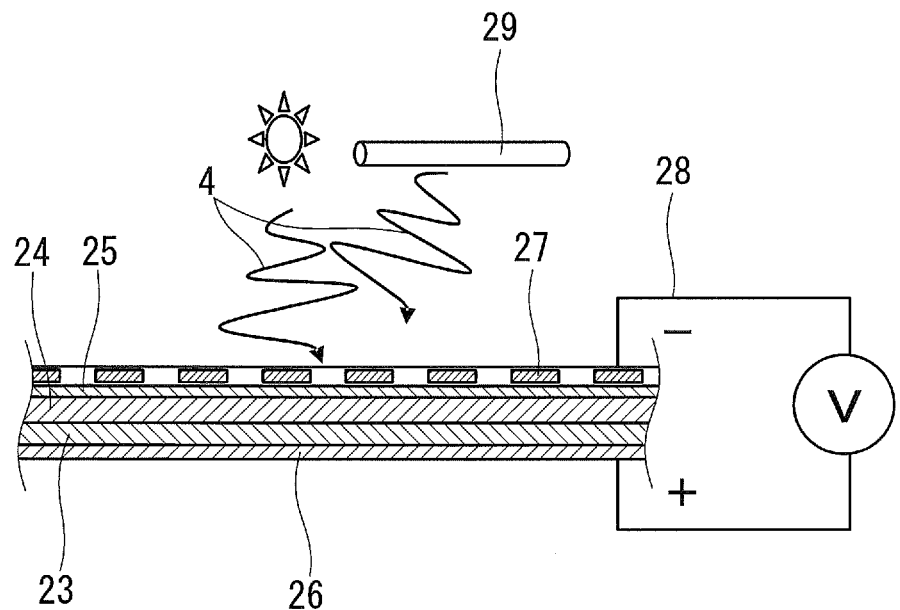
FIG. 13 is a schematic view showing an example of a solar cell.

FIG. 13 is a schematic view showing a structural example of the solar cell of the present embodiment. The solar cell shown in FIG. 13 includes: a p-type semiconductor layer 23 composed of the optically pumped semiconductor according to the present invention; an n-type semiconductor layer 24 bonded to the p type semiconductor layer 23; an antireflection film 25 disposed on the surface of the light irradiation side of the n-type semiconductor layer 24; an electrode (positive electrode) 26 disposed on the p-type semiconductor layer 23; and an electrode (negative electrode) 27 disposed on the antireflection film 25. The solar cell is connected to an external circuit 28. Although not illustrated, the antireflection film 25 has through portions in part so that the n-type semiconductor layer 24 and the negative electrode 27 are connected electrically to each other via the through portions. In the solar cell of the present embodiment, it also is possible to use a fluorescent lamp 29 as a light source.

Embodiment 4

In the present embodiment, a description will be made with respect to an example of a device in which the optically pumped semiconductor according to the present invention as described in Embodiment 1 is used and the optically pumped semiconductor is irradiated with light so as to decompose an organic substance.

Figure 14:
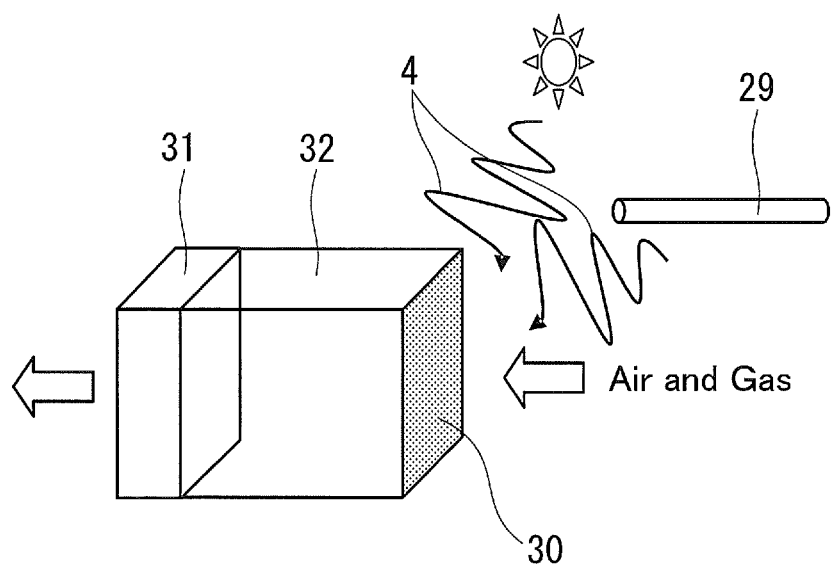
FIG. 14 is a schematic view showing an example of an antibacterial deodorization device.

FIG. 14 shows an example of an antibacterial deodorization device that is the organic substance decomposing device of the present embodiment. This antibacterial deodorization device is fabricated by providing a light-transmissive casing 32 with an optically pumped semiconductor filter 30 on the side from which unprocessed air and gas are drawn into the light-transmissive casing 32. The optically pumped semiconductor filter 30 is obtained by applying and fixing powder composed of the optically pumped semiconductor according to the present invention onto a glass substrate. The light-transmissive casing 32 is provided with a fan 31 on the side from which the processed air and gas are discharged. The air and gas to be processed pass through the filter 30 when being drawn into the light-transmissive casing 32. When the filter 30 is irradiated with light, organic substances in the air and gas are decomposed by the photocatalytic effect of the optically pumped semiconductor according to the present invention provided in the filter 30 when passing through the filter 30.

Actually, when a film on which the optically pumped semiconductor according to the present invention ($BaZr_{0.8}In_{0.2}O_{3-\alpha}$ was used here) had been applied was put in a box having a certain volumetric capacity, an odor component, such as acetaldehyde, was charged thereinto, and the film was irradiated with light for a certain time, and then the odor was smelled, the odor was found to be reduced. Moreover, when the concentration of the odor component was measured with an indicator tube or the like before and after the irradiation, the concentration after the irradiation was lower. It also was confirmed that acetic acid was produced from acetaldehyde when the same device was used. This means that a partial oxidation reaction or a partial reduction reaction of the organic substance also was made.

Embodiment 5

In the present embodiment, a description will be made with respect to another example of the device in which the optically pumped semiconductor according to the present invention as described in Embodiment 1 is used and the optically pumped semiconductor is irradiated with light so as to decompose an organic substance.

Figure 15A:
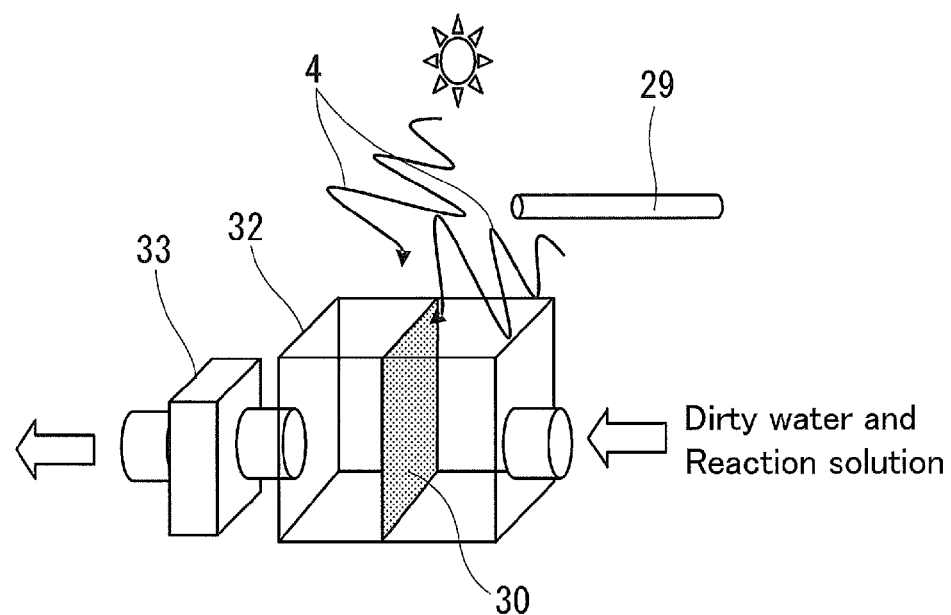
FIG. 15A is a schematic view showing an example of a water purifying device.
Figure 15B:
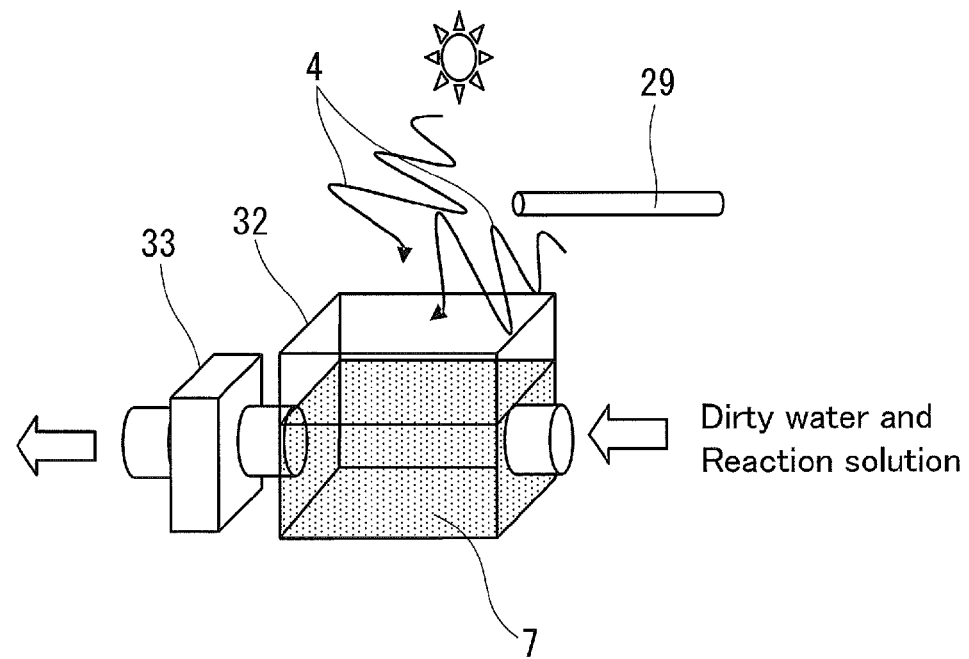
FIG. 15B is a schematic view showing another example of the water purifying device.

The device of the present embodiment is a water purifying device that purifies water by decomposing an organic substance in water. FIG. 15A is a schematic view showing a water purifying device utilizing the optically pumped semiconductor filter 30 used in the antibacterial deodorization device of Embodiment 4. An organic substance in dirty water sent to the inside of the light-transmissive casing 32 is decomposed by the photocatalytic effect of the optically pumped semiconductor filter 30 disposed in the light-transmissive casing 32, and discharged to the outside of the light-transmissive casing 32 by a liquid-sending pump 33. FIG. 15B is a schematic view of a water purifying device that utilizes, instead of the optically pumped semiconductor filter 30, the dispersion 7 obtained by dispersing powder of the optically pumped semiconductor according to the present invention in water.

Actually, a color fading test using a BTB solution was conducted on a dispersion obtained by dispersing powder of the optically pumped semiconductor according to the present invention ($BaZr_{0.8}Ga_{0.2}O_{3-\alpha}$ was used here) in water. First, the dispersion of the optically pumped semiconductor was put in a beaker, and the BTB solution further was dropped thereinto to color the dispersion (with a color between yellow and blue). When the dispersion was irradiated with light from the outside of the beaker, color fading was observed. From this result, it can be judged that the optically pumped semiconductor according to the present invention was irradiated with light so as to decompose the BTB solution, and thereby the color of the BTB solution was faded. In this way, it has been confirmed that the optically pumped semiconductor according to the present invention makes it possible to purify an organic substance and a pollutant in water.

In Embodiment 1, an example in which a powdered specimen with a particle diameter of about 10 μm or less was used was described as an example in which the powder of the optically pumped semiconductor according to the present invention was used as a specimen for producing hydrogen. However, the particle diameter of the powder is not particularly limited, and the specimen may be provided in a form of nanoparticles. Or it may be a film instead of powder. A Pt co-catalyst for accelerating catalytic activity further was used with the specimen for producing hydrogen. However, The Pt co-catalyst may not be used, and its amount is not limited, either. The co-catalyst may not be Pt and may be, for example, Ni, Ru, Ag, or Pd. As the fixing method, a photoreduction method or an impregnation method may be used. The quartz cell 8 described in Embodiments 1 to 5 may be a cell composed of another material that allows light to transmit therethrough easily, that is, the material may be pyrex (registered trademark) or glass. In the evaluation method in which water is decomposed, a solution obtained by adding, to distilled water, $AgNO_3$, methanol, $La_2O_3$ serving as a PH adjustor is used. However, it is possible, of course, to use distilled water only, or to add further a buffer agent, such as sodium bicarbonate and potassium sulfide. A trace amount of KOH and/or HCl may be contained in the aqueous solution.

The dimensions of the components of the device described in each of the Embodiments 2 to 5 are not particularly limited. For example, the method for forming each film may be an application method or an electrolytic deposition method, and the thickness and dimensions of the film are not limited. Although a description was made with respect to the example of using a platinum film as the counter electrode when the optically pumped semiconductor according to the present invention was used as an electrode for producing hydrogen, silver or copper also can be used as the material for the counter electrode, and the dimensions thereof are not limited. Furthermore, in Embodiments 1 to 5, examples in which a xenon lamp light as quasi sunlight, sunlight, or a fluorescent lamp light was used as the light source were described. However, LED light also can be used as long as it is light including visible light, and the light intensity thereof is not specified. There is no problem, of course, to the device even in the case where an ultraviolet ray lamp, such as a mercury-vapor lamp, or a black light is used. In the example of evaluation method in which hydrogen is produced, room temperature or a thermostatic bath is used. However, the ambient temperature is not specified in the actual device and evaluation.

INDUSTRIAL APPLICABILITY

The optically pumped semiconductor according to the present invention is useful for photocatalyst-related technologies and solar cell-related technologies, for example: devices for producing hydrogen with sunlight, solar cells, deodorization devices such as air purifying apparatuses, antibacterial films, antifouling films, super-hydrophilic films, anti-fogging films, and water purifying devices; synthesis of methanol from $CO_2$ and water.

The invention claimed is:

1. A solar cell comprising an optically pumped semiconductor that is configured to generate electricity when being irradiated with light,
    wherein the optically pumped semiconductor is a semiconductor of a perovskite oxide,
    wherein the optically pumped semiconductor has a composition represented by a general formula: $BaZr_{1-x}M_xO_{3-\alpha}$, where M denotes at least one element selected from trivalent elements, x denotes a numerical value more than 0 but less than 0.8, and α denotes an amount of oxygen deficiency that is a numerical value more than 0 but less than 1.5, and has a crystal system of a cubic, tetragonal, or orthorhombic crystal, and when lattice constants of the crystal system are referred to as a, b, and c, provided that a≤b≤c, conditions that 0.41727 nm≤a, b, c≤0.42716 nm and a/c≥0.98 are satisfied.

2. The solar cell according to claim 1, wherein x denotes a numerical value of at least 0.1 but not more than 0.6 in the general formula: $BaZr_{1-x}M_xO_{3-\alpha}$.

3. The solar cell according to claim 2, wherein x denotes a numerical value of at least 0.1 but not more than 0.25 in the general formula: $BaZr_{1-x}M_xO_{3-\alpha}$.

4. The solar cell according to claim 1, wherein M is at least one selected from the group consisting of In, Ga, and Gd in the general formula: $BaZr_{1-x}M_xO_{3-\alpha}$.

5. The solar cell according to claim 1, wherein the general formula: $BaZr_{1-x}M_xO_3$, is at least one selected from $BaZr_{0.9}In_{0.1}O_{3-\alpha}$, $BaZr_{0.875}In_{0.125}O_{3-\alpha}$, $BaZr_{0.8}In_{0.2}O_{3-\alpha}$, $BaZr_{0.8}Ga_{0.2}O_{3-\alpha}$, and $BaZr_{0.8}Gd_{0.2}O_{3-\alpha}$.

6. The solar cell according to claim 5, wherein the general formula: $BaZr_{1-x}M_xO_{3-\alpha}$ is $BaZr_{0.8}In_{0.2}O_{3-\alpha}$.

7. The solar cell according to claim 1, wherein the perovskite oxide is a single-phase sintered body and has a density that is 96% or more of a theoretical density.

8. The solar cell according to claim 1, wherein the optically pumped semiconductor is provided in a form of powder or a film.

9. The solar cell according to claim 1, wherein the optically pumped semiconductor is accommodated in a cell that allows sunlight to transmit therethrough.

10. The solar cell according to claim 1, wherein a fluorescent lamp is used for irradiating the optically pumped semiconductor with light.

11. The solar cell according to claim 1, further comprising a p-type semiconductor layer, and an n-type semiconductor layer bonded to the p-type semiconductor layer,
wherein the optically pumped semiconductor is included in the p-type semiconductor layer.

12. A hydrogen and/or oxygen producing device comprising an optically pumped semiconductor that is configured to decompose water and thereby produce hydrogen and/or oxygen when being irradiated with light,
wherein the optically pumped semiconductor is a semiconductor of a perovskite oxide,
the optically pumped semiconductor has a composition represented by a general formula: $BaZr_{1-x}M_xO_{3-\alpha}$, where M denotes at least one element selected from trivalent elements, x denotes a numerical value more than 0 but less than 0.8, and α denotes an amount of oxygen deficiency that is a numerical value more than 0 but less than 1.5, and has a crystal system of a cubic, tetragonal, or orthorhombic crystal, and when lattice constants of the crystal system are referred to as a, b, and c, provided that a≤b≤c, conditions that 0.41727 nm≤a, b, c≤0.42716 nm and a/c≥0.98 are satisfied.

13. The device according to claim 12, wherein x denotes a numerical value of at least 0.1 but not more than 0.6 in the general formula: $BaZr_{1-x}M_xO_{3-\alpha}$.

14. The device according to claim 13, wherein x denotes a numerical value of at least 0.1 but not more than 0.25 in the general formula: $BaZr_{1-x}M_xO_{3-\alpha}$.

15. The device according to claim 12, wherein M is at least one selected from the group consisting of In, Ga, and Gd in the general formula: $BaZr_{1-x}M_xO_{3-\alpha}$.

16. The device according to claim 12, wherein the general formula: $BaZr_{1-x}M_xO_{3-\alpha}$ is at least one selected from $BaZr_{0.9}In_{0.1}O_{3-\alpha}$, $BaZr_{0.875}In_{0.125}O_{3-\alpha}$, $BaZr_{0.8}In_{0.2}O_{3-\alpha}$, $BaZr_{0.8}Ga_{0.2}O_{3-\alpha}$, and $BaZr_{0.8}Gd_{0.2}O_{3-\alpha}$.

17. The device according to claim 16, wherein the general formula: $BaZr_{1-x}M_xO_{3-\alpha}$ is $BaZr_{0.8}In_{0.2}O_{3-\alpha}$.

18. The device according to claim 12, wherein the perovskite oxide is a single-phase sintered body and has a density that is 96% or more of a theoretical density.

19. The device according to claim 12, wherein the optically pumped semiconductor is provided in a form of powder or a film.

20. The device according to claim 12, wherein the optically pumped semiconductor is accommodated in a cell that allows sunlight to transmit therethrough.

21. The device according to claim 12, wherein a fluorescent lamp is used for irradiating the optically pumped semiconductor with light.

22. The hydrogen and/or oxygen producing device according to claim 12, wherein the optically pumped semiconductor is provided in a form of powder, and the powder of the optically pumped semiconductor is dispersed in water.

23. The hydrogen and/or oxygen producing device according to claim 12, further comprising a photocatalytic electrode and a counter electrode connected electrically to the photocatalytic electrode,
wherein the optically pumped semiconductor is included in the photocatalytic electrode.

24. A method for generating electricity, comprising:
preparing an optically pumped semiconductor; and
irradiating the optically pumped semiconductor with light,
wherein
the optically pumped semiconductor is a semiconductor of a perovskite oxide, the optically pumped semiconductor has a composition represented by a general formula; $BaZr_{1-x}M_xO_{3-\alpha}$, where M denotes at least one element selected from trivalent elements, x denotes a numerical value more than 0 but less than 0.8, and α denotes an amount of oxygen deficiency that is a numerical value more than 0 but less than 1.5, and has a crystal system of a cubic, tetragonal, or orthorhombic crystal, and when lattice constants of the crystal system are referred to as a, b, and c, provided that a≤b≤c, conditions that 0.041727 nm≤a, b, c≤0.42716 nm and a/c≥0.98 are satisfied.

25. A method for generating hydrogen and/or oxygen, comprising:
preparing an optically pumped semiconductor and water; and
irradiating the optically pumped semiconductor with light to decompose the water,
wherein
the optically pumped semiconductor is a semiconductor of a perovskite oxide,
the optically pumped semiconductor has a composition represented by a general formula; $BaZr_{1-x}M_xO_{3-\alpha}$, where M denotes at least one element selected from trivalent elements, x denotes a numerical value more than 0 but less than 0.8, and α denotes an amount of oxygen deficiency that is a numerical value more than 0 but less than 1.5, and has a crystal system of a cubic, tetragonal, or orthorhombic crystal, and when lattice constants of the crystal system are referred to as a, b, and c, provided that a≤b≤c, conditions that 0.041727 nm≤a, b, c≤0.42716 nm and a/c≥0.98 are satisfied.

* * * * *